(12) United States Patent
Roach, Jr. et al.

(10) Patent No.: US 8,290,801 B1
(45) Date of Patent: Oct. 16, 2012

(54) SYSTEM AND METHOD FOR PROVIDING BUILDING PRODUCT SPECIFICATION AND PRODUCT RECOMMENDATIONS

(75) Inventors: Walter Roach, Jr., Telford, PA (US); Eric Marcussen, Drexel Hill, PA (US); Gregory F. Jacobs, Oreland, PA (US)

(73) Assignee: Certainteed Corporation, Valley Forge, PA (US)

( * ) Notice: Subject to any disclaimer, the term of this patent is extended or adjusted under 35 U.S.C. 154(b) by 890 days.

(21) Appl. No.: 12/351,091

(22) Filed: Jan. 9, 2009

Related U.S. Application Data

(60) Provisional application No. 61/020,427, filed on Jan. 11, 2008.

(51) Int. Cl.
G06Q 40/00 (2006.01)
(52) U.S. Cl. ...................................... 705/7.11; 705/7.42
(58) Field of Classification Search ............. 705/7, 7.11, 705/7.42
See application file for complete search history.

(56) References Cited

U.S. PATENT DOCUMENTS

| | | | | |
|---|---|---|---|---|
| 5,189,606 | A * | 2/1993 | Burns et al. ................... | 705/7.23 |
| 5,319,541 | A * | 6/1994 | Blanchard et al. ............. | 705/29 |
| 6,236,409 | B1 * | 5/2001 | Hartman ....................... | 345/629 |
| 6,393,410 | B1 | 5/2002 | Thompson | |
| 6,446,053 | B1 * | 9/2002 | Elliott ........................... | 705/400 |
| 6,625,619 | B1 | 9/2003 | McClendon et al. | |
| 6,836,752 | B2 | 12/2004 | Atasoy | |
| 6,907,404 | B1 * | 6/2005 | Li ................................. | 705/36 R |
| 6,922,701 | B1 | 7/2005 | Ananian et al. | |
| 7,003,477 | B2 * | 2/2006 | Zarrow ......................... | 705/7.41 |
| 7,006,977 | B1 | 2/2006 | Attra et al. | |
| 7,062,514 | B2 * | 6/2006 | Harris .................................. | 1/1 |
| 7,249,063 | B2 | 7/2007 | McMullen et al. | |
| 7,389,255 | B2 | 6/2008 | Formisano | |
| 7,434,244 | B2 | 10/2008 | Popov et al. | |
| 7,769,595 | B2 * | 8/2010 | Lopez et al. ................... | 705/1.1 |
| 2001/0032062 | A1 | 10/2001 | Plaskoff et al. | |
| 2002/0046044 | A1 * | 4/2002 | Johnston et al. ................. | 705/1 |
| 2003/0171957 | A1 * | 9/2003 | Watrous ........................... | 705/4 |
| 2004/0015367 | A1 | 1/2004 | Nicastro et al. | |

(Continued)

OTHER PUBLICATIONS

"Pickering Incorporated Achieves Both Time Savings and Quality Improvements with SpecLink", BSD Customer Care Case Study, 2006 Building Systems Design, Inc.

*Primary Examiner* — Thomas Dixon
*Assistant Examiner* — Benjamin S Fields
(74) *Attorney, Agent, or Firm* — Abel Law Group, LLP; Alexander H. Plache

(57) ABSTRACT

A system is disclosed that is designed to enable users to obtain a customized specification for a particular project, and to develop a final specification for the associated building project along with a variety of up to date supportive technical documentation relating to the selected building products and systems. The system may include a computer implemented work flow that presents the user with a plurality of screens to elicit user responses to various building product selection criteria. Based on the user responses, a list of qualifying building products/systems is presented to the user for final selection. The system is PC based for ease of use at a work site, and may periodically be connected to one or more manufacturers' web sites via the Internet to download the most recent information available about the manufacturer's products. The system contains a green feature that enables users to minimize the environmental impact of the building project.

35 Claims, 36 Drawing Sheets

U.S. PATENT DOCUMENTS

| | | | |
|---|---|---|---|
| 2004/0083231 A1* | 4/2004 | Boros et al. | 707/104.1 |
| 2004/0243421 A1 | 12/2004 | Jannott et al. | |
| 2005/0044010 A1* | 2/2005 | Jannott et al. | 705/26 |
| 2005/0108982 A1 | 5/2005 | Formisano | |
| 2005/0171896 A1* | 8/2005 | Seretti et al. | 705/37 |
| 2006/0074738 A1* | 4/2006 | Vanhoose et al. | 705/8 |
| 2006/0168573 A1* | 7/2006 | Clark et al. | 717/140 |
| 2008/0288265 A1 | 11/2008 | Wollert et al. | |
| 2009/0216552 A1* | 8/2009 | Watrous | 705/1 |
| 2010/0324947 A1* | 12/2010 | Needham | 705/7 |
| 2010/0324956 A1* | 12/2010 | Lopez et al. | 705/7 |
| 2011/0000402 A1* | 1/2011 | Grasso, Jr. | 106/713 |
| 2011/0060621 A1* | 3/2011 | Weller et al. | 705/7.29 |
| 2011/0112887 A1* | 5/2011 | Rizzolo et al. | 705/7.28 |

* cited by examiner

Roof Proposal

Prepared For:

| | |
|---|---|
| Company: | Fake Building |
| Address: | 456 There St |
| City: | Here |
| StateProvince: | NC |
| Zip/Postal: | 72206 |
| Country: | |
| Phone: | 123-456-7890 |

Prepared By:

| | |
|---|---|
| Name: | JR Roach |
| Address: | 123 here st |
| City: | there |
| StateProvince: | pa |
| Zip/Postal: | 19422 |
| Country: | |
| Phone: | 123-456-7890 |

FIG. 14A

CertainTeed Commercial Roofing

Project Information

General Information

Date Of Report: 1/29/2009
Source: CertaSpec
NameOfProject: test
Description:
Spec Number: GTA-C-B3
Type: Commercial

Created By

Name: JR Roach
Company: Certain Teed Corporation
Address: 123 here st
City: there
StateProvince: pa
Zip/Postal: 19422
Country:
Phone: 123-456-7890

Created For

Company: Fake Building
Address: 456 There St
City: Here
StateProvince: NC
Zip/Postal: 72206
Country:
Phone: 123-456-7890

Spec Selections

Warranty Programs

Type: No Dollar Limit Warranty
Term (years): 20

Deck Type

Type: Structural Concrete
Slope (in/ft):

Coatings

Type:

FIG. 14B

CertainTeed Corporation
Roofing
1400 Union Meeting Rd
P O Box 1100
Blue Bell, PA 19422
610-341-7000
215-542-7129

Date: 03/23/2009

Name: JR Roach
Address: 123 here st there pa 19422
E-mail: 123@there.com

RE: Potential LEED-NC Credits
Job Name: test
Job Location: 456 There St Here NC 72206
CertainTeed Products: GTA-C-B3 Little Rock Thank you for your interest in CertainTeed Roofing poducts. The information provided below will answer your questions regarding specific Roofing products and how they contribute to Leadership in Energy and Environmental Design (LEED) for New Construction (NC) green building standards.

CertainTeed respects the environment through the responsible development of sustainable building products and systems. CertainTeed supplies "green" building products and established its "Building Responsibly" program as part of our ongoing effort to become the preeminent supplier of sustainable building products. For more information, please visit http://www.certainteed.com/certainteed/building-responsibly. CertainTeed is a member of the U.S. Green Building Council and supports their efforts under the Leadership in Energy and Environmental Design (LEED) program, as well as other programs having similar goals.

CertainTeed's roofing products may help to contribute to the following LEED-NC Credit Categories:

| | |
|---|---|
| Sustainable Sites | SS Credit 7.2 - Heat Island Effect: Roof |
| Energy & Atmosphere | EA Prerequiste 2 - Minimum Energy Performance |
| Energy & Atmosphere | EA Credit 1 - Optimize Energy Performance |
| Materials & Resources | MR Credit 4 - Recycled Content |
| Materials & Resources | MR Credit 5 - Local/Regional Materials |
| Indoor Environmental Quality | EQ Credit 7.1 - Thermal Comfort, Comply with ASHRAE 55-2004 |
| Inovation & Design Process | ID Credit 1.1 - Innovation in Design |

The following tables contain the information you requested. The values listed indicate the extent to which our products can help contribute toward LEED Credit points.

For more information, visit our web site at: www.certainteed.com. If you need more information please do not hesitate to contact us. Thank you for selecting CertainTeed Roofing products to assist you with achieving LEED Certification for this project.

Sincerely,
CertainTeed Roofing Technical Service

Job Name: test
Job Location: 456 There St Here NC 72206

FIG. 15A

| Product 1 | Product Name/Color | Black Diamond Base |
|---|---|---|
| | Source Plant Name/Zip Code | Shakopee/55379 |

| Description | Leed Credit Category | Contribution Value |
|---|---|---|
| Cool Roof | SS 7.2 | SRI = N/A |
| Minimum Energy Performance | EA Pr 2 | N/A |
| Optimize Energy Performance | EA 1 | N/A |
| Recycled Material Content* (% by wgt) | MR 4.1 & 4.2 | 24.61% |
| Local Material Content** (% by wgt) | MR 5.1 & 5.2 | 0.0 |
| Thermal Comfort | EQ 7 | N/A |
| Innovation in Design | ID 1.1 | N/A |

| Product 2 | Product Name/Color | Flintlastic STA |
|---|---|---|
| | Source Plant Name/Zip Code | Little Rock/72206 |

| Description | Leed Credit Category | Contribution Value |
|---|---|---|
| Cool Roof | SS 7.2 | SRI = N/A |
| Minimum Energy Performance | EA Pr 2 | N/A |
| Optimize Energy Performance | EA 1 | N/A |
| Recycled Material Content* (% by wgt) | MR 4.1 & 4.2 | 3.16% |
| Local Material Content** (% by wgt) | MR 5.1 & 5.2 | 93.96% |
| Thermal Comfort | EQ 7 | N/A |
| Innovation in Design | ID 1.1 | N/A |

| Product 3 | Product Name/Color | Flintlastic GTA White Diamond CoolStar |
|---|---|---|
| | Source Plant Name/Zip Code | Little Rock/72206 |

| Description | Leed Credit Category | Contribution Value |
|---|---|---|
| Cool Roof | SS 7.2 | SRI = 94.5% |
| Minimum Energy Performance | EA Pr 2 | N/A |
| Optimize Energy Performance | EA 1 | N/A |
| Recycled Material Content* (% by wgt) | MR 4.1 & 4.2 | 2.60% |
| Local Material Content** (% by wgt) | MR 5.1 & 5.2 | 95.98% |
| Thermal Comfort | EQ 7 | N/A |
| Innovation in Design | ID 1.1 | N/A |

\* Pre-Consumer = Post-Industrial
\*\* Local material content based on manufacturing plant location of specific product/color selected and specific job location.

Roof Proposal

Prepared For:

Company: Test Job
Address: 123 here
City: there
StateProvince: NC
Zip/Postal: 27565
Country:
Phone:

Prepared By:

Name: JR Roach
Address: 1400 Union Meeting Rd
City: Blue Bell
StateProvince: PA
Zip/Postal: 19422
Country:
Phone:

FIG. 25A

 CertainTeed Residential Roofing

Ventilation
Ventilation: Yes

Weight
Weight:

Deck Type
Type:
Slope (in/ft): 3/12

Underlayment Waterproof
Type: Winterguard Sand

Underlayment Water Resistant
Type: Roofers Select

Algae Resistant
Algae Resistant:

Impact
IR:

Ridge Accessories
Type: Shangle Ridge

Starter
Type: High Performance Starter

Category
Type:

Color
Color: Country Slate

Reflective Emmitance Values
Solar Reflectance (SR): N/A
Thermal Emmitance (TE): N/A
Solar Reflectance Index (SRI): N/A

FIG. 25C

CertainTeed Corporation
Roofing
1400 Union Meeting Rd
P O Box 1100
Blue Bell, PA 19422
610-341-7000
215-542-7129

Date:     03/23/2009

Name:    JR Roach
Address: 1400 Union Meeting Rd Blue Bell PA 19422
E-mail:

RE:      Potential LEED-NC Credits
Job Name:            test1
Job Location:        123 here there NC 27565
CertainTeed Products: Centennial Slate Oxford Thank you for your interest in CertainTeed Roofing poducts. The information provided below will answer your questions regarding specific Roofing products and how they contribute to Leadership in Energy and Environmental Design (LEED) for New Construction (NC) green building standards.

CertainTeed respects the environment through the responsible development of sustainable building products and systems. CertainTeed supplies "green" building products and established its "Building Responsibly" program as part of our ongoing effort to become the preeminent supplier of sustainable building products. For more information, please visit http://www.certainteed.com/certainteed/building-responsibly. CertainTeed is a member of the U.S. Green Building Council and supports their efforts under the Leadership in Energy and Environmental Design (LEED) program, as well as other programs having similar goals.

CertainTeed's roofing products may help to contribute to the following LEED-NC Credit Categories:

| | |
|---|---|
| Sustainable Sites | SS Credit 7.2 - Heat Island Effect: Roof |
| Energy & Atmosphere | EA Prerequiste 2 - Minimum Energy Performance |
| Energy & Atmosphere | EA Credit 1 - Optimize Energy Performance |
| Materials & Resources | MR Credit 4 - Recycled Content |
| Materials & Resources | MR Credit 5 - Local/Regional Materials |
| Indoor Environmental Quality | EQ Credit 7.1 - Thermal Comfort, Comply with ASHRAE 55-2004 |
| Inovation & Design Process | ID Credit 1.1 - Innovation in Design |

The following tables contain the information you requested. The values listed indicate the extent to which our products can help contribute toward LEED Credit points.

For more information, visit our web site at: www.certainteed.com. If you need more information please do not hesitate to contact us. Thank you for selecting CertainTeed Roofing products to assist you with achieving LEED Certification for this project.

Sincerely,
CertainTeed Roofing Technical Service

Job Name:      test1
Job Location:  123 here there NC 27565

FIG. 26A

| Product 1 | Product Name/Color | Centennial Slate Country Slate |
|---|---|---|
| | Source Plant Name/ZIP Code | Oxford/27565 |

| Description | Leed Credit Category | Contribution Value |
|---|---|---|
| Cool Roof | SS 7.2 | SRI=N/A |
| Minimum Enegry Performance | EA Pr2 | N/A |
| Optimize Enegry Performance | EA 1 | N/A |
| Recycled Material Content* (%by wgt) | MR 4.1 & 4.2 | 6.23% |
| Local Material Content** (% by wgt) | MR 5.1 & 5.2 | 77.98% |
| Thermal Comfort | EQ 7 | N/A |
| Innovation in Design | ID 1.1 | N/A |

| Product 2 | Product Name/Color | Roofers Select |
|---|---|---|
| | Source Plant Name/ZIP Code | Shreveport/71107 |

| Description | Leed Credit Category | Contribution Value |
|---|---|---|
| Cool Roof | SS 7.2 | SRI=N/A |
| Minimum Enegry Performance | EA Pr 2 | N/A |
| Optimize Enegry Performance | EA 1 | N/A |
| Recycled Material Content* (%by wgt) | MR 4.1 & 4.2 | 43.59% |
| Local Material Content** (% by wgt) | MR 5.1 & 5.2 | 0 |
| Thermal Comfort | EQ 7 | N/A |
| Innovation in Design | ID 1.1 | N/A |

| Product 3 | Product Name/Color | Winterguard Sand |
|---|---|---|
| | Source Plant Name/ZIP Code | Shakopee/55379 |

| Description | Leed Credit Category | Contribution Value |
|---|---|---|
| Cool Roof | SS 7.2 | SRI=N/A |
| Minimum Enegry Performance | EA Pr 2 | N/A |
| Optimize Enegry Performance | EA 1 | N/A |
| Recycled Material Content* (%by wgt) | MR 4.1 & 4.2 | 22.18% |
| Local Material Content** (% by wgt) | MR 5.1 & 5.2 | 0 |
| Thermal Comfort | EQ 7 | N/A |
| Innovation in Design | ID 1.1 | N/A |

| Product 4 | Product Name/Color | Shangle Ridge |
|---|---|---|
| | Source Plant Name/ZIP Code | Oxford/27565 |

FIG. 26B

SYSTEM AND METHOD FOR PROVIDING BUILDING PRODUCT SPECIFICATION AND PRODUCT RECOMMENDATIONS

CROSS-REFERENCE TO RELATED APPLICATIONS

This is a non-provisional of U.S. provisional patent application Ser. No. 61/020,427, filed Jan. 11, 2008, by Walter Roach et al., titled "System and Method for Providing Building Product Specification and Product Recommendations," the entirety of which application is incorporated by reference herein.

FIELD OF THE DISCLOSURE

The disclosure relates to systems and methods for facilitating the selection of residential or commercial construction products/systems, and more particularly to systems and methods for facilitating user selection of residential or commercial construction products/systems that enable the automatic creation of specification documents from the most up to date manufacturer information available.

BACKGROUND OF THE DISCLOSURE

Automated systems and methods for enabling users to select building products are known. For example, systems such as those described in U.S. Patent Application Publication Nos. 2004/0243421 and 2005/0044010 to Jannott et al., can be used to develop specifications for construction projects via an Internet website. Such systems typically enable the simple population of a specification form based on answers to a series of questions. The form can then be used to order the materials for a building project, but it does not provide a complete set of supportive documents including technical data sheets, drawings, etc., that architects and others require in order to complete their submittal packages.

As a result, although existing systems providing some degree of increased convenience as compared to traditional pen and paper systems, they still suffer from deficiencies. Specifically, such systems may not provide the potential end user, such as a property owner or local contractor, with a complete specification that includes the most up to date supporting documents (e.g., technical details, specifications, drawings, and the like) that are required or desired as part of a completed project submission. Additionally, such systems may not provide the most up to date specification or drawings information available from the products manufacturer, and thus the architects or others using the specifications may still be required to manually assemble the additional backup information, often from what can turn out to be outdated company manuals. Further, since these systems are Internet based, they may not be convenient for use at a building or work site that does not have Internet connectivity. Thus, there is a need for an automated system that addresses these deficiencies.

SUMMARY OF THE DISCLOSURE

The disadvantages heretofore associated with the prior art are overcome by the disclosed system and method for automated development of a completed building project specification, including supporting technical specifications, drawings and other information. The disclosed system and method provide enhanced ease of use, enhanced time and cost efficiencies, and a more robust final building specification as compared to previous systems and methods.

Thus, a system is disclosed that is designed to enable consumers, as well as professionals, to obtain a customized specification for a particular project, whether residential, commercial, or institutional, and to download a resulting specification for the associated building project, along with a variety of supportive documents that are required as part of planning and construction processes. Various aspects of the final specification may then be provided to architects, engineers, consultants, contractors, facility managers, institutional officials, commercial property owners, and private homeowners. The system may include a plurality of screens or displays including one or more electronic questionnaires designed to elicit user responses to various building product selection criteria. These electronic questionnaires may be supported by various decision support databases as well as a library of visual/graphic details and diagrams. In addition, "Green Calculators" (e.g., LEED point calculators, recycled content calculators), can be provided to assist the user in selecting building systems and products to enhance the "green design" of a building project.

A building product selection method is disclosed, comprising: providing a database comprising a plurality of building products; accepting user selections of building project criteria; correlating one or more of said plurality of building products with said building project criteria; and providing a user with recommendations of one or more building products and combinations of building products based on said correlating step.

A building product selection system is disclosed comprising a database containing information describing a plurality of building products; an interface for accepting user selections of building project criteria; and a processor executing instructions for correlating one or more of said plurality of building products with said building project criteria.

Also disclosed is a machine readable storage device tangibly embodying a series of instructions executable by the machine to perform a series of steps, the steps comprising: accepting user selections of building project criteria; querying a database comprising information describing a plurality of building products; correlating one or more of said plurality of building products with said building project criteria based on a comparison between said building project criteria and said information describing said plurality of building products; and providing a user with recommendations of one or more building products and combinations of building products based on said correlating step.

A roofing product selection method is disclosed, comprising providing a database comprising a plurality of roofing products; accepting user selections of roofing project criteria; correlating one or more of said plurality of roofing products with said roofing project criteria; and providing a user with recommendations of one or more roofing products and combinations of roofing products based on said correlating step.

BRIEF DESCRIPTION OF THE DRAWINGS

The details of the invention, both as to its structure and operation, may be obtained by a review of the accompanying drawings, in which like reference numerals refer to like parts, and in which:

FIG. 6 is an exemplary main commercial project selection screen of the disclosed system;

FIG. 9 is an exemplary main commercial project selection screen of the disclosed system in which a plurality of selection fields have been filled in;

FIGS. 14A-C show an exemplary roof project proposal generated using the disclosed system;

FIGS. 15A and 15B show an exemplary LEED letter generated using the disclosed system;

FIG. 20 is an exemplary main commercial project selection screen of the disclosed system in which a plurality of selection fields have been filled in;

FIGS. 25A-C show an exemplary residential roof project proposal generated using the disclosed system;

FIGS. 26A and 26B show an exemplary LEED letter generated using the disclosed system;

DETAILED DESCRIPTION

Figure 1:
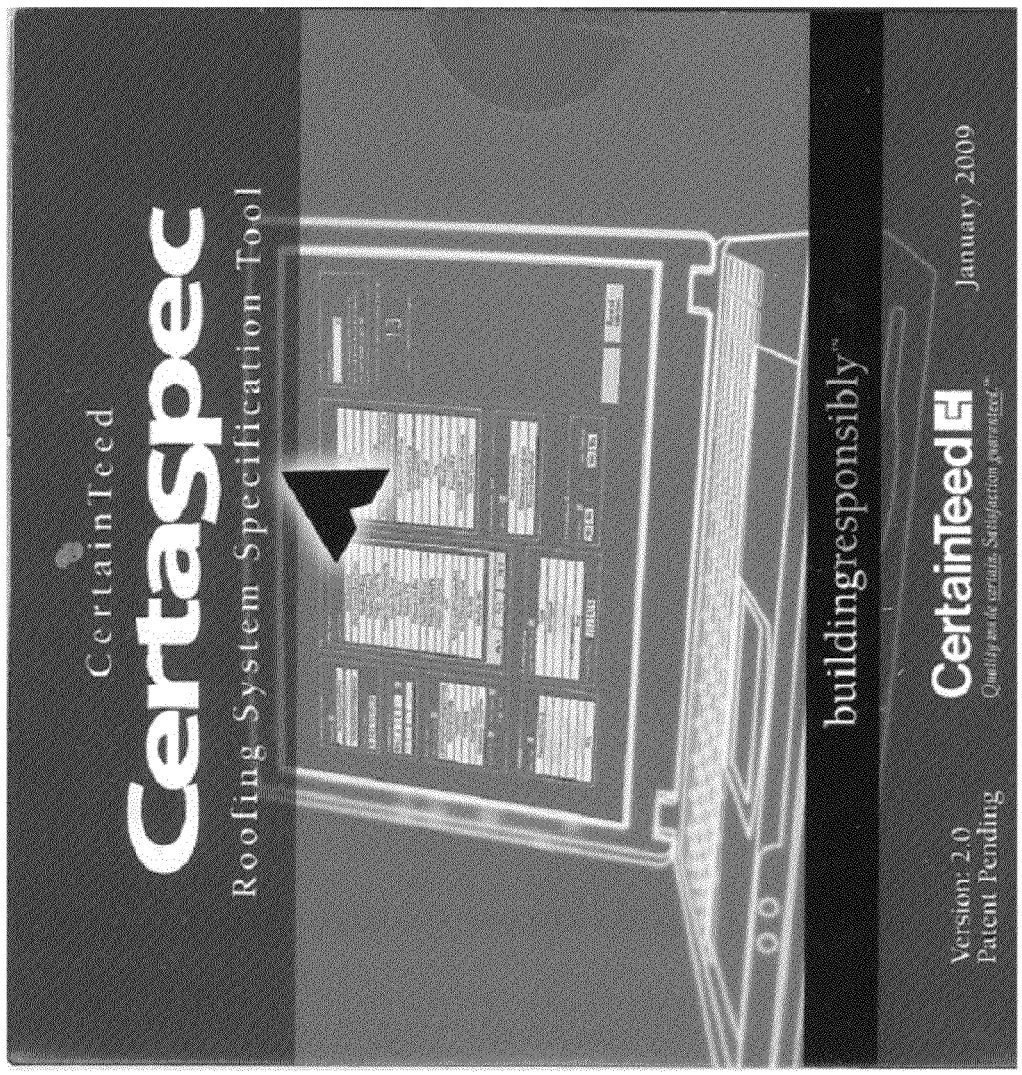
FIG. 1 is an exemplary main introduction/update screen running an embodiment of the disclosed system.

The purpose of the disclosed system is to facilitate the selection of specific building products and/or building products systems that will be used for a residential or commercial construction project based on certain selection criteria provided by the user. Based on the user's selection criteria, the system provides recommendations for specific building products and/or combinations of building products that fit the user's criteria. The system then gathers building product/system information into a completed specification package that can include product specification sheets, technical data sheets, technical drawing details, and the like, to result in a complete job submittal package for the project.

The system may include a stand alone (i.e., PC based) software program that is menu-driven to enable easy use by individuals in the construction and building products industries. For the purposes of this application, the term "user" will be interpreted as anyone involved in a residential or commercial construction process, including but not limited to builders, architects, building owners, tradesman, specifiers, developers, contractors, owners and sales representatives.

In general, the system presents the user with a number of screens or displays that enable quick click selection of a variety of criteria relating to a building project. A non-limiting examples of such criteria include the following:

whether the project is a residential or commercial building;
whether the project is new construction or renovation;
what type of product warranty is desired, and how long;
for commercial roofing applications—what type of roofing system is desired, what type of deck is involved, what base/ply/cap types are desired, and whether a radiant-energy reflectant material is desired;
for residential roofing applications—what type of roofing system is desired, what type of deck is involved, what underlayment is desired, whether algae resistance is desired, and whether ridge accessories are desired;
what color or style product is preferred;
whether recycled content information for products is preferred.

As will be described in greater detail later, the criteria selection screens are presented in a logical format that walks the user through the selection process. A listing of relevant qualifying products is displayed on the screen, based on the user's criteria selections, and this list is automatically reduced as additional criteria are selected. The displayed products/systems will be those that most closely match the user's criteria. A reduced list of qualifying products is provided to the user as the criteria are selected. From this reduced list, the user can then select the final product/system for inclusion in the project specification.

In one embodiment, the system may be limited to displaying only those qualifying building products/systems or components or accessories made or offered by a single manufacturer. Alternatively, the system may include building products/systems or components or accessories offered by multiple manufacturers.

The system may enable the user to designate and save a specific selection session with a "project name," and to tag the session with project specific information such as customer name, address, phone number and other descriptive information regarding the specific project. In this manner the project may be saved for recall (and modification) at a later date, if desired.

As part of the selection process, the system may provide users with access to manufacturer construction drawings and other detailed technical information regarding selected products. Most manufacturers provide documentation (drawings, instructions, etc.) that includes recommendations regarding how their specific building products/systems should be installed and maintained. The system may also provide the user with access to technical data sheets regarding any accessory items (screws, coatings, insulation, primers) they may be interested in using as part of the building project. Such information is valuable in forming a completed specification, and is also helpful to users such as architects who may use and/or modify such documentation to develop their own project submission materials. The disclosed system may automatically provide access to this documentation, which may be viewed immediately or may be downloaded for future review in any of a variety of formats, a non-limiting list of which includes .dwf, .dwg, .dxf, .pdf, .jpg, .mpb, .gif, .tif, .ppt, and .pub.

Where applicable, the system may also enable the user to view and make style and color selections for various products, such as molding, siding, decking, windows or roofing shingles, and may also inform the user of any applicable regional availability constraints. This feature may facilitate the selection of colors and styles because it enables the user to immediately view them on the computer screen, without the need to refer to cumbersome manufacturer catalogs.

The system may have a live update feature that enables the user and/or a building products company administrator to download to the user's PC, handheld device, or removable media the most recent product information available, including product specification information, product technical details, installation drawings, regional availability, color availability, and the like. This feature ensures that the selections made by the user are based on the most up to date information available. This live update feature may be supported via the manufacturer's web site via a public or private portal, or through a separate dedicated web site. Alternatively, the update information may be provided in e-mail form to users, such as in a self-executing file, or it could be via order and delivery of physical media containing most recent updates. The update information also could be stored on removable medium and shipped to users.

It will be appreciated that the system may be provided with access control measures to limit the ability of a building product company to directly modify stored product information. This may occur, for example, where management and/or operation of the system is outsourced to an organization that is not part of the building products company, and thus, authority to change information in the system would reside in the organization's system administrator or other appropriate individual(s).

The system itself may be downloaded by a user from a website, or it may be obtained by ordering physical media for installation on the user's computer.

The system may include links to active websites to allow access to detailed product and warranty information. In one embodiment, a user may access a website that enables on-line registration in a warranty program (e.g., SureStart for residential roofing extended warranty program (1110, FIG. 28A), and NDL.com for commercial roofing warranty program (1100, FIG. 28A).

The live update feature may eliminate the need for users (architects, builders, etc.) to maintain libraries of product catalogs and manuals, which can become quickly outdated. The ability to automatically download updated information about existing products, and also to download information regarding newly available products, is advantageous because it enables users to have the most current information at their fingertips. It also eliminates inefficiencies associated with cross-referencing between electronic and hard-copy information, as required with current systems. The live update feature may be automatically run each time the user starts the system (where the user is connected to the Internet via a hard line or wireless connection). Alternatively, the user may choose to manually run the update feature when desired. In other alternatives, the user may order updates on physical media.

In addition to the performance-related specification criteria noted above, the system may also incorporate one or more "green" features that enable the user to select products based on their environmental friendliness. In one embodiment, the system may include a "recycled material" selection option that would show the user applicable products that include recycled content. Alternatively, the system may automatically or selectably provide a running tally of the total percentage of recycled materials included in all selected products, given a particular set of performance criteria.

In addition, the system may include a feature for computing "green points" (e.g., Leadership in Energy and Environmental Design (LEED) points and/or National Association of Home Builders (NAHB) points) for a selected building product and/or system, or for the overall building project. Such points are often calculated based on a number of factors, including resource efficiency, energy efficiency, global impact, locally available indigenous materials, recycled content, durability, and the like. The result of such a system is that a qualifying building or project may be LEED certified, or may qualify for a NAHB rating (e.g., Bronze, Silver or Gold). The live update feature may include the ability to automatically provide the system with any updates or changes to the current standards for such "green certifications."

In one embodiment, the system automatically determines potentially regionally-sourced products for LEED certification. To do this, the system first determines if the site where the product will be installed (i.e., the jobsite) is within 500 miles of the plant in which the product is manufactured. If it is, the system next determines whether the raw materials sourced for that product originated within 500 miles of the jobsite. In one embodiment, this process is implemented using a zip code input.

In addition to the basic environmental benefit of providing such "green" standards, various government organizations are expected to require such certifications as part of their contract process.

The system may also include a module that performs energy savings calculations that correspond to a particular roofing configuration and/or roofing system. The system may provide the user with a link to an energy savings calculator that can enable a user to estimate the energy benefits of various candidate roofing installations. Separate "Green Calculators" (e.g., LEED calculators, recycled content calculators), can also be provided in a similar manner.

In some embodiments, the system can have multiple user tiers, each of which provides an appropriate level of detail to a particular user depending upon that user's experience or sophistication level. For example, if a "basic" user (e.g., homeowner) is using the system, the system may function to provide simplified overview information regarding the project in an easy to understand format. Product specification details, detailed installation instructions and the like may be of little interest or use to such a "basic" user and thus they may not be provided. For more advanced users (e.g., builders, specifiers, architects), the system may have a "power" option which provides a wide range of enhanced specification and other details that are important to such users. As will be appreciated, the system may accommodate more than two user-types and may be divided into a variety of versions (e.g., CertaSpec, CertaSpec Deluxe, CertaSpec Premier, CertaSpec Builder, CertaSpec Architect, CertaSpec Homeowner, etc.)

A pre-configured system (e.g., "basic," "power") may be provided to the user (either by download or removable media). Alternatively, the system may be configured to include all user levels, allowing the user the option of selecting their own "user type" at the time of use. In addition, the system may allow the user to customize their user type to provide enhanced detail regarding certain desired aspects of the project, and lesser detail regarding other aspects of the project.

In some embodiments, the system can allow the user to select from a variety of optional supplemental products, such as automatic roof and structure leak detection systems, roof and gutter heaters, and the like. For example, supplemental roof leak detection systems and/or structure leak detection systems may allow homeowners to continuously monitor for leaks in roofs and other building structures to enable early detection and repair of defective or damage conditions. Systems of this type are manufactured by Detec Systems LLC, of Tacoma Wash. Alternatively, supplemental eave and gutter heating systems may enable homeowners in cold climates to prevent roof leakage due to ice buildup in Winter months. Systems of this type are manufactured by Heat Trace Products, LLC, of Leominster, Mass.

A link to one or more company websites may be provided to enable the user to obtain additional detailed information about such optional supplemental products. In one embodiment, the system may operate to show the user only those supplemental products that are compatible with the type of roof system or building being specified, the geographic region in which the project is located, and the like. The system may prompt the user at one or more appropriate points in the process to select such optional systems.

In one embodiment, the program may work in reverse of the above general description. That is, the system may include a reverse lookup feature that enables the user to directly specify a particular company's building product or building product system. The system may then provide information about what criteria support that selection (e.g., warranty duration, type of building the product/system should be used in, what approvals may be associated with the selection). This feature may be helpful for those users who know what product color or style they would like (e.g., black roofing shingles), but may not know about what warranties are available for the product, what housewrap is required, what underlayments might be needed, etc.

Once all of the items have been selected by the user, a selected item listing may be printed out for preparation of a job submittal package. As previously noted, this job submittal package may include a complete specification listing of the selected building products or building product systems, technical data sheets relating to the selected products and/or selected accessories, installation details and drawings, MSDS's, and the like. The job submittal package may ultimately be provided to architects, builder, contractors, town/county building inspectors, sales reps, etc.

Referring now to the Figures, an exemplary system implementation will be described in greater detail. FIG. 1 shows an exemplary introduction screen running an embodiment of the disclosed system. It will be appreciated that although the illustrated embodiment is directed to a Roofing System Specification Tool, it may be adapted to any of a variety of building construction and/or renovation projects, including roofing, siding, windows, rails, decking, wallboard, ceilings, foundation, plumbing, electrical, flooring, insulation and the like. If the computer or handheld on which the system is loaded is connected or connectable to the Internet, the Live Update feature may be automatically implemented when the system is started. As previously noted, the Live Update feature allows the user to connect via either a dial-up connection or other connection over the Internet to a manufacturer's web site or other dedicated site for downloading updated building products/systems information. The user may elect to skip this feature for a particular session, and may manually run the update later, as desired.

Figure 2:
FIG. 2 is an exemplary main menu screen of the disclosed system enabling users to select between different project types.

FIG. 2 shows a Main Menu screen that enables the user to select between multiple applications, including residential and commercial applications. This selection may be used to tailor the subsequent query screens so that only the most relevant queries are presented to the user. The welcome screen may also have links to allow the user manage their account, get information about the system, link to a manufacturer's website (e.g., CertainTeed.com), or exit the program.

Figure 3:
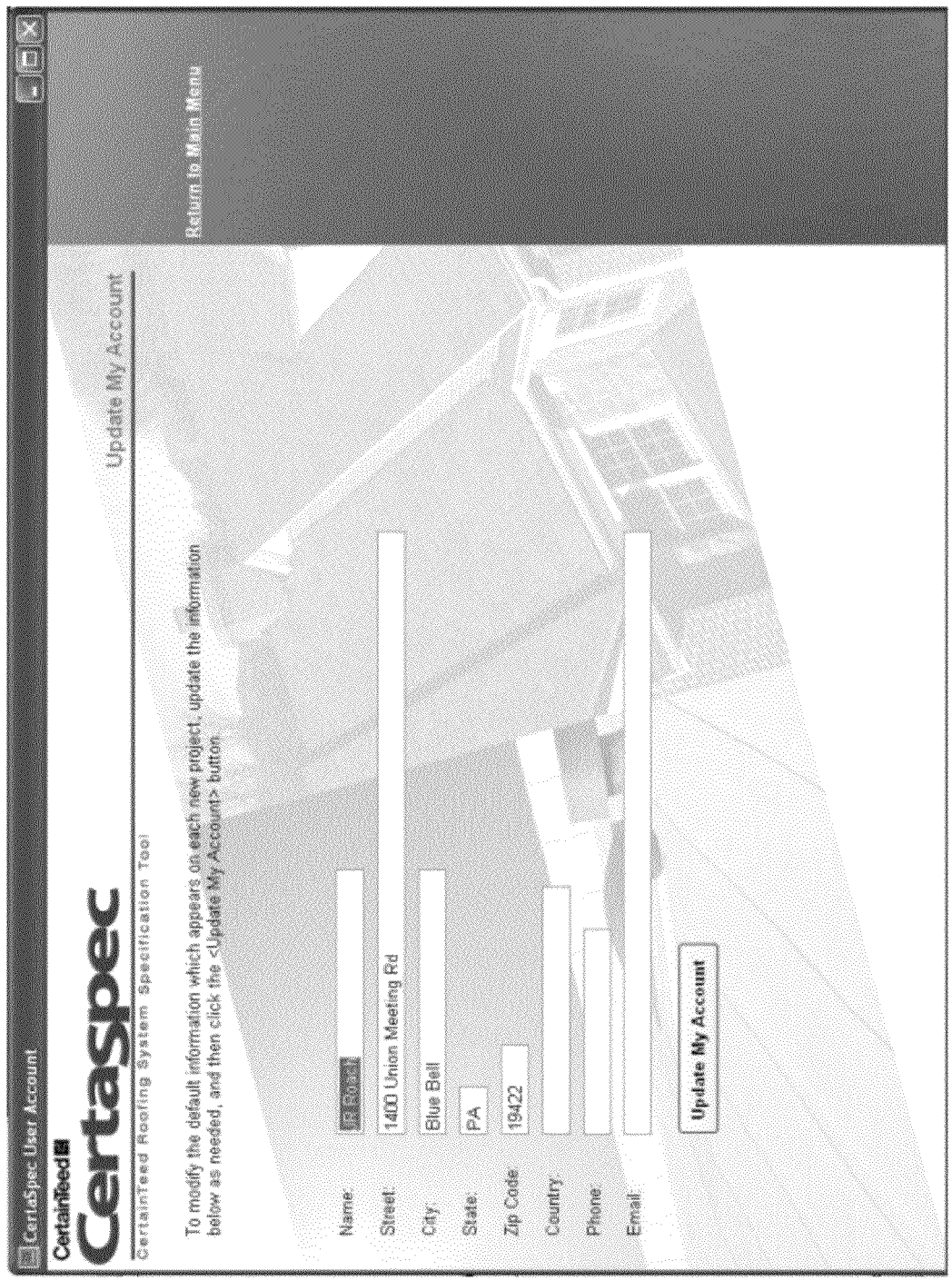
FIG. 3 is an exemplary account update screen of the disclosed system.

In FIG. 3, the "Manage My Account" feature has been selected from the Main Menu, and an exemplary "Update My Account" screen is generated. This screen enables the user to update user name, address, phone and e-mail information relating to a particular project. When finished editing this information the can select the "Update My Account" button (e.g., via mouse click or other selection method) to return to the Main Menu.

It will be appreciated that the links, icons, and drop down menus of the system may be selectable using any of a variety of methods, including single or double mouse-clicks, a keyboard cursor, a touch screen, and the like. In addition, though navigation through the system is described in relation to links, icons, and drop down menus, that such methods of navigation are not exclusive and others may also be used.

Figure 4:
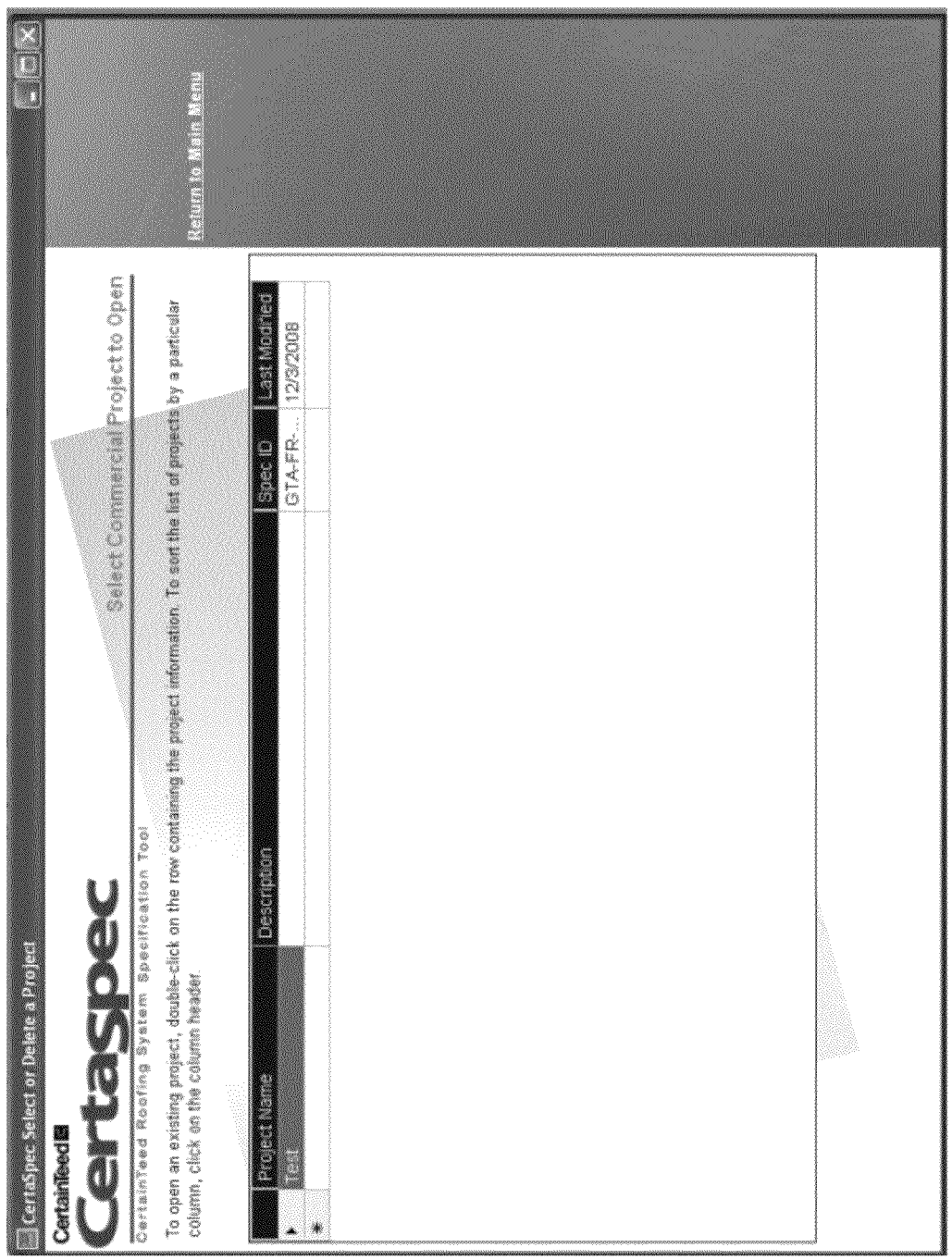
FIG. 4 is an exemplary selection screen of the disclosed system that enables a user to open an existing project.
Figure 5:
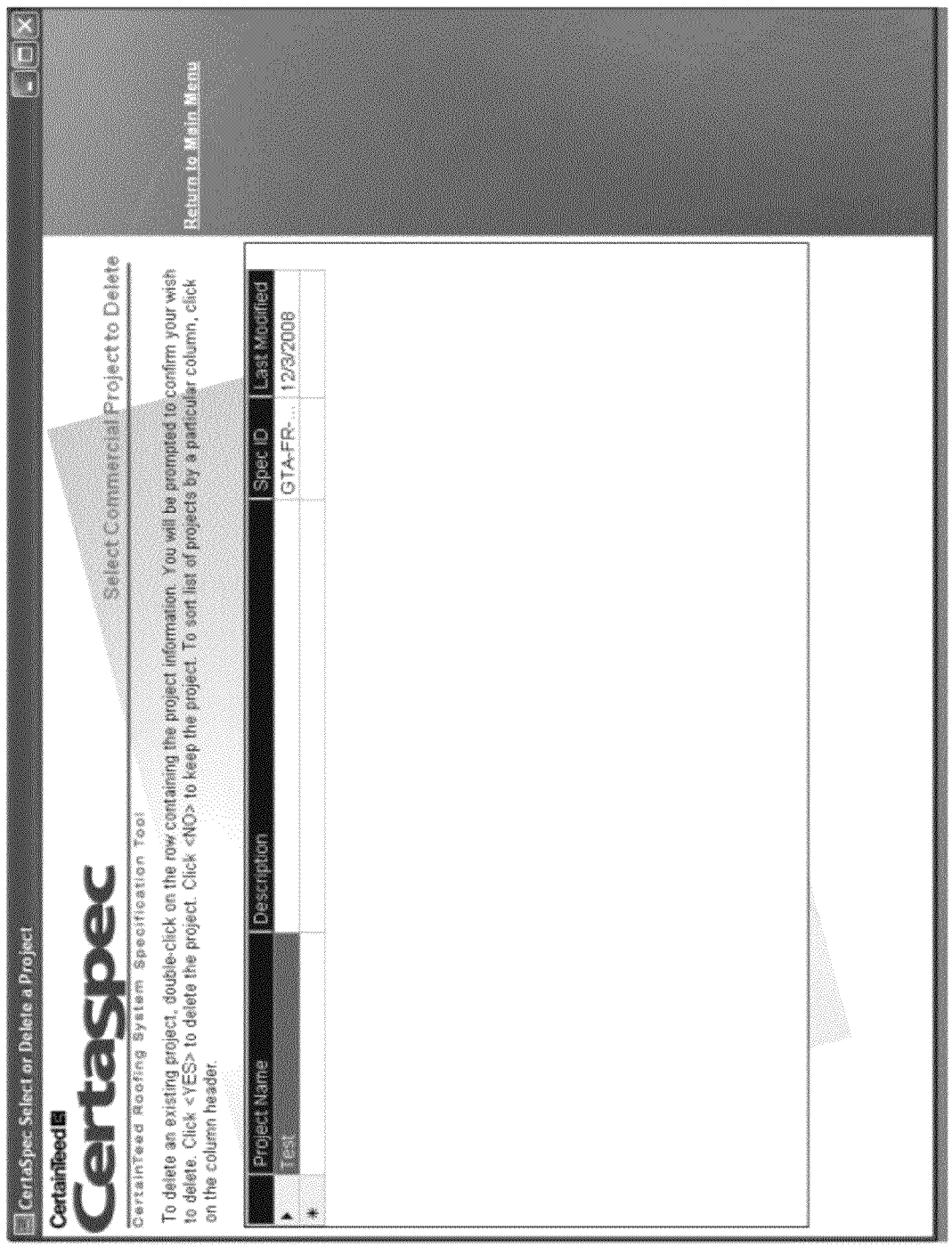
FIG. 5 is an exemplary selection screen of the disclosed system that enables a user to delete an existing project.

If a Commercial or Residential project has previously been created, then the user can return to that project by selecting the appropriate link in the Main Menu. In FIG. 4, the "Open Existing Project" feature has been selected from the Main Menu under the "Commercial Menu" heading. A "Select Commercial Project to Open" screen is shown, from which the user can select a particular project to open. In FIG. 5, the "Delete Existing Project" feature has been selected from the Main Menu, under the "Commercial Menu" heading. Thus, a "Select Commercial Project to Delete" screen is shown, from which the user can double-click on a particular project to delete.

Figure 6:
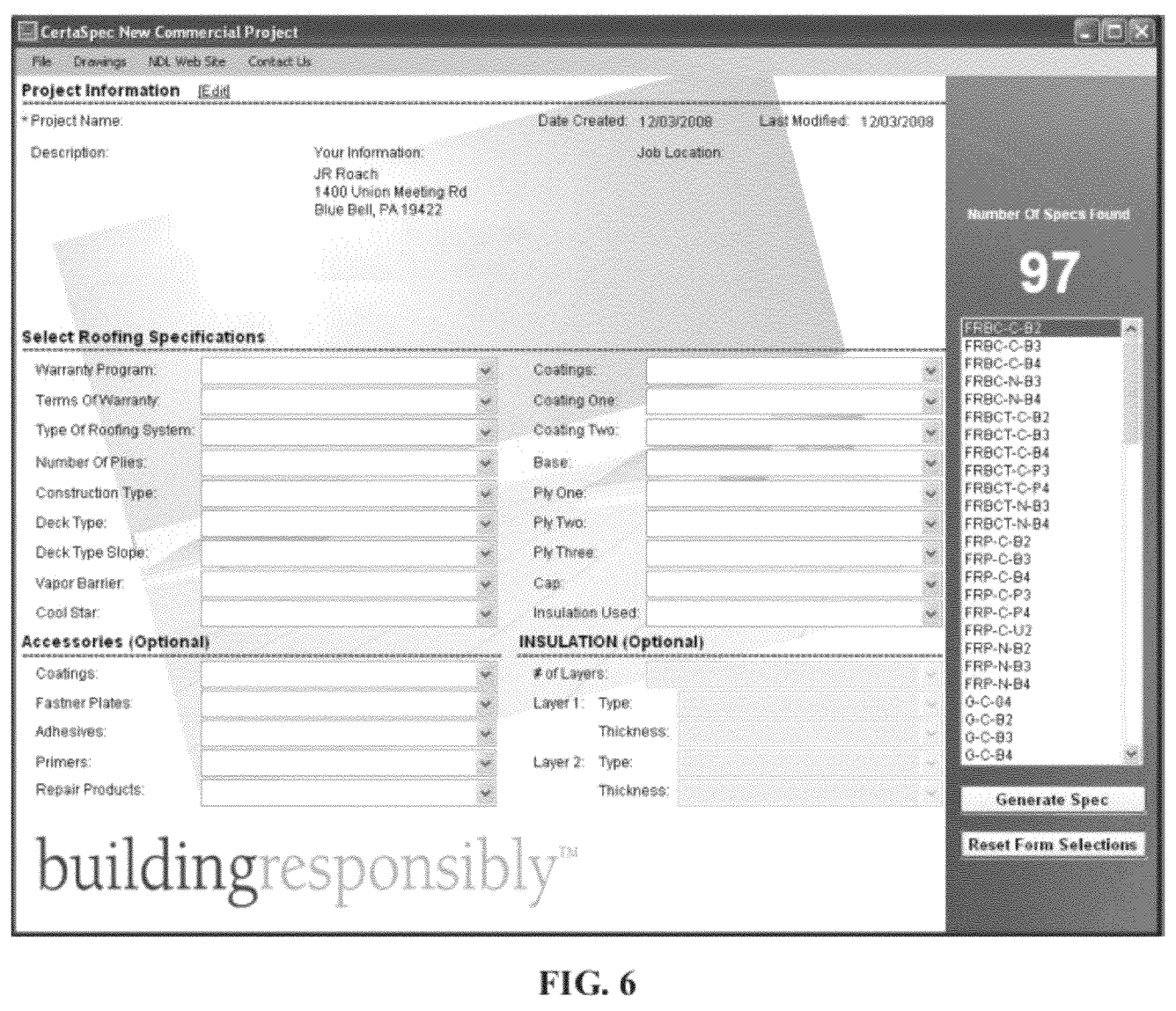

A new project can be created by selecting that option under the Commercial or Residential Menu headings of the Main Menu of FIG. 2. In FIG. 6, the "Create New Project" link has been selected from the Main Menu, and a "New Commercial Project" screen is shown. A variety of features are provided on the FIG. 6 screen, including links or drop-downs at the top of the screen that enable the user to obtain drawings, access an NDL website (for obtaining product warranty information), or contact the system administrator and/or appropriate sales support personnel.

Figure 7:
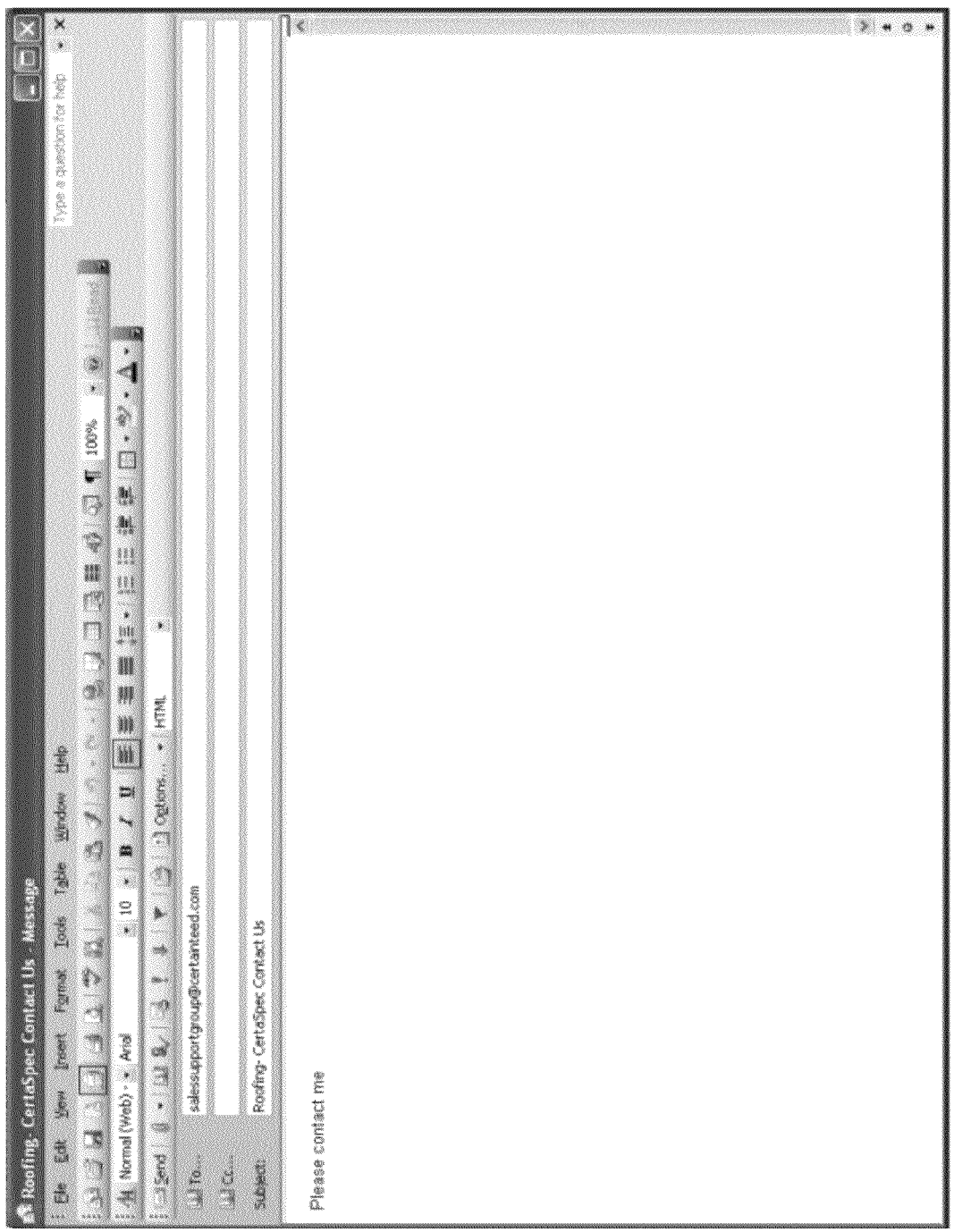
FIG. 7 is an exemplary e-mail support request generated by the disclosed system.

If the "Contact Us" link is selected, a pre-addressed e-mail page (FIG. 7) may be automatically displayed. In the illustrated embodiment, the e-mail contains an automatically generated request for the addressee to contact the user. It will be appreciated, however, that other specific informational requests can also be included in the body of the e-mail.

Figure 8:
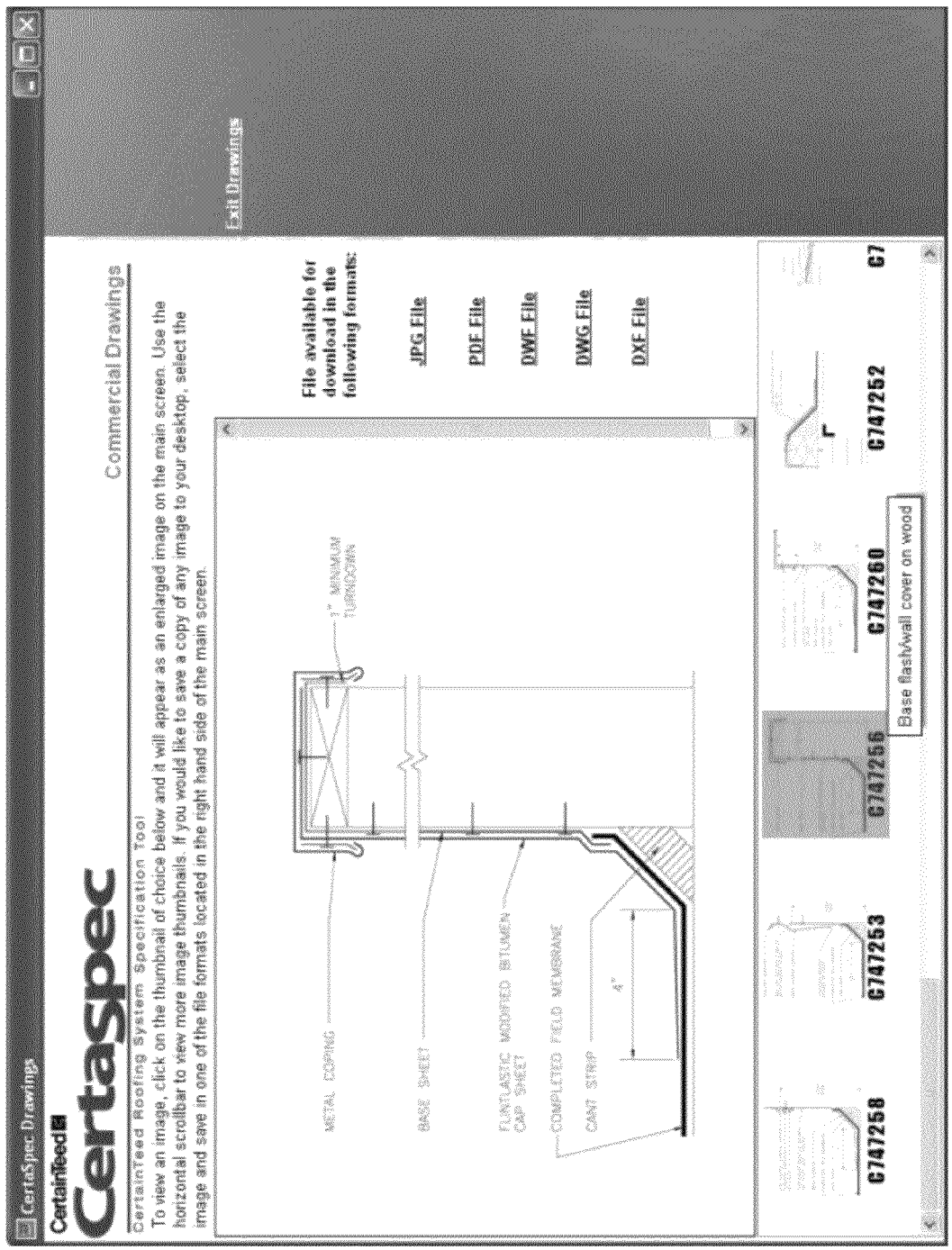
FIG. 8 is an exemplary drawing screen of the disclosed system.

If the "Drawings" link is selected from the FIG. 6 screen, a drawings page (FIG. 8) may be automatically displayed. In the illustrated embodiment, a plurality of drawing thumbnails are provided along the bottom portion of the screen. Hovering the mouse cursor over a particular thumbnail reveals the title of the particular drawing (e.g., "Base flash/wall cover on wood"). Double-clicking on the thumbnail results in a large size display of the thumbnail appearing in the large portion of the screen. When a desired drawing selection is made, the user can download the drawing in a desired format (e.g., .jpg, .pdf, .dwf, .dwg, .dxf). Clicking on the desired format will result in the drawing being saved to the user's computer desktop.

In the FIG. 6 screen, the user can add or modify information regarding the project by clicking the "Edit" link next to the "Project Information" heading. Appropriate information can then be selected from any of the entries provided under the "Select Roofing Specifications," "Accessories," or "Insulation" headings. As previously mentioned, although such selections are shown as drop-down menu selections, though other methods of inputting such information may also be used.

In the illustrated embodiment, the user can input information into the form in response to a variety of selections. Thus, the FIG. 6 Main Menu screen allows the user to select from a variety of Warranty Programs, the type of roofing system (mop/self adhered, mop/torch, cold process, self adhered, mop, torch), and the construction type (new construction, remodel). Additional selection boxes enable selection of deck type, whether insulation is desired, whether coatings are desired, what type of base/ply/cap is desired, and whether a reflectant surface (e.g., CoolStar™) is desired. A product tally display is provided (shown on the right hand side of the screen), which includes a listing of all products (in this case a listing of the roofing systems) that meet the user-entered selections from the predefined fields. As shown, at the outset 97 individual products/systems were displayed. As selections are made from within the predefined fields, the number of products listed in the product tally display decreases so that only those products that meet the user's selected criteria remain displayed. Thus, the selections made in FIG. 9 result in a single product specification being shown as meeting the project criteria entered by the user.

Additionally, as certain fields are selected, other fields may automatically become unavailable for selection until only those products and/or systems that best fit the user's selected criteria are shown.

If the user would like to change any selections at this point, the form can be reset by selecting the "Reset Form Selections" button. Alternatively, the user can choose to generate a project specification by clicking on the specified product entry in the specification listing, and then selecting the "Generate Spec" button.

Figure 10:
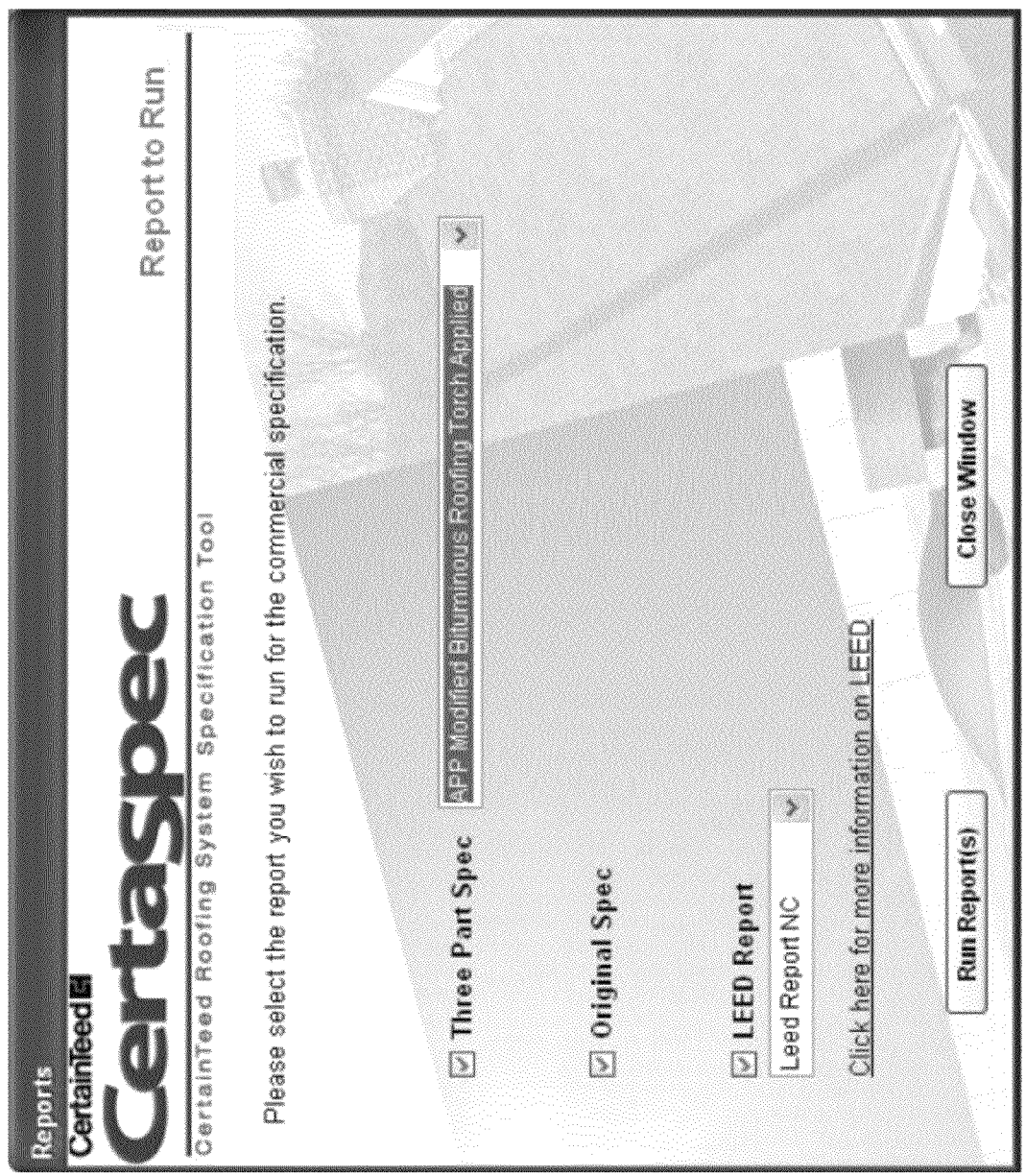
FIG. 10 is an exemplary commercial project report screen of the disclosed system.

When the "Generate Spec" button is clicked, a "Reports" screen, shown as FIG. 10, appears. This screen enables the user to choose from a variety of reporting options. In the illustrated embodiment, the user is provided the option of selecting a "Three Part Spec," an "Original Spec" and a "LEED Report." One or more of these options can be selected to generate one or more reports, as desired.

If the "Three Part Spec" option is selected, a drop-down box will appear, providing the user with further options of generic specification types that are available and that align with the system of choice. Selecting the "Original Spec" option provides the user with a summary report for the project. The "Original Spec" may include a summary of all the selections made on the selection screen and includes, but is not limited to, product selection, warranty type, warranty term, accessories and system specification. If the "LEED Report" option is selected, then a LEED Report type drop-down box will be displayed, requesting the user to select from a plurality of LEED options: (1) "LEED CS"—core and shell, (2) "LEED EB"—existing building, (3) "LEED NC—new construction, and (4) "LEED H"—homes. A link is also provided to enable the user to obtain information about LEED. It will be appreciated that although the illustrated embodiment includes LEED report selections, NAHB selections may also be provided to enable the user to generate one or more NAHB reports.

Figure 9:
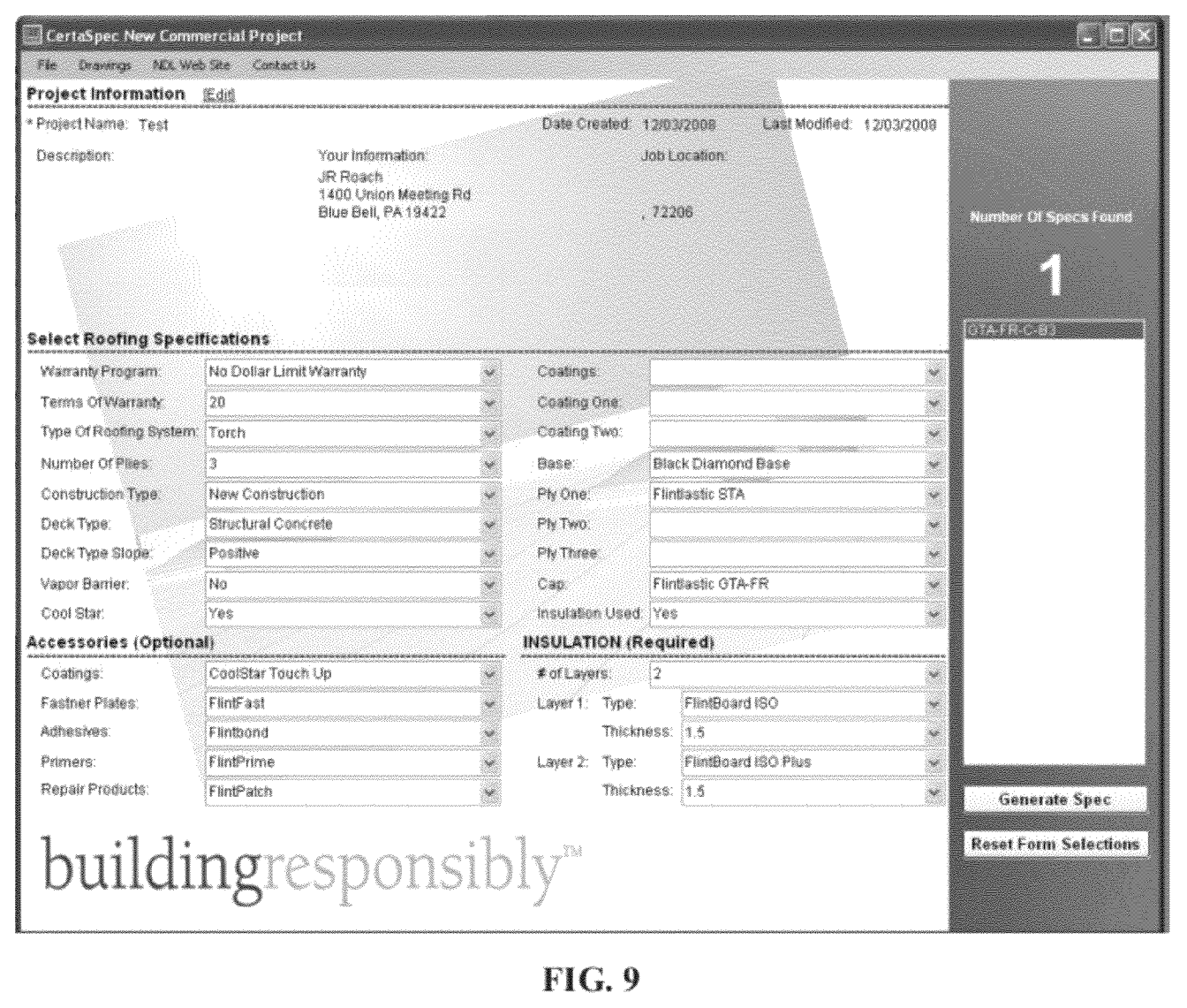

A "Close Window" button is provided to enable the user to return to the previous screen to modify any previous selections (FIG. 9). Once the final report selections are made, the "Run Report(s)" button may be selected to generate the desired report(s).

Figure 11:
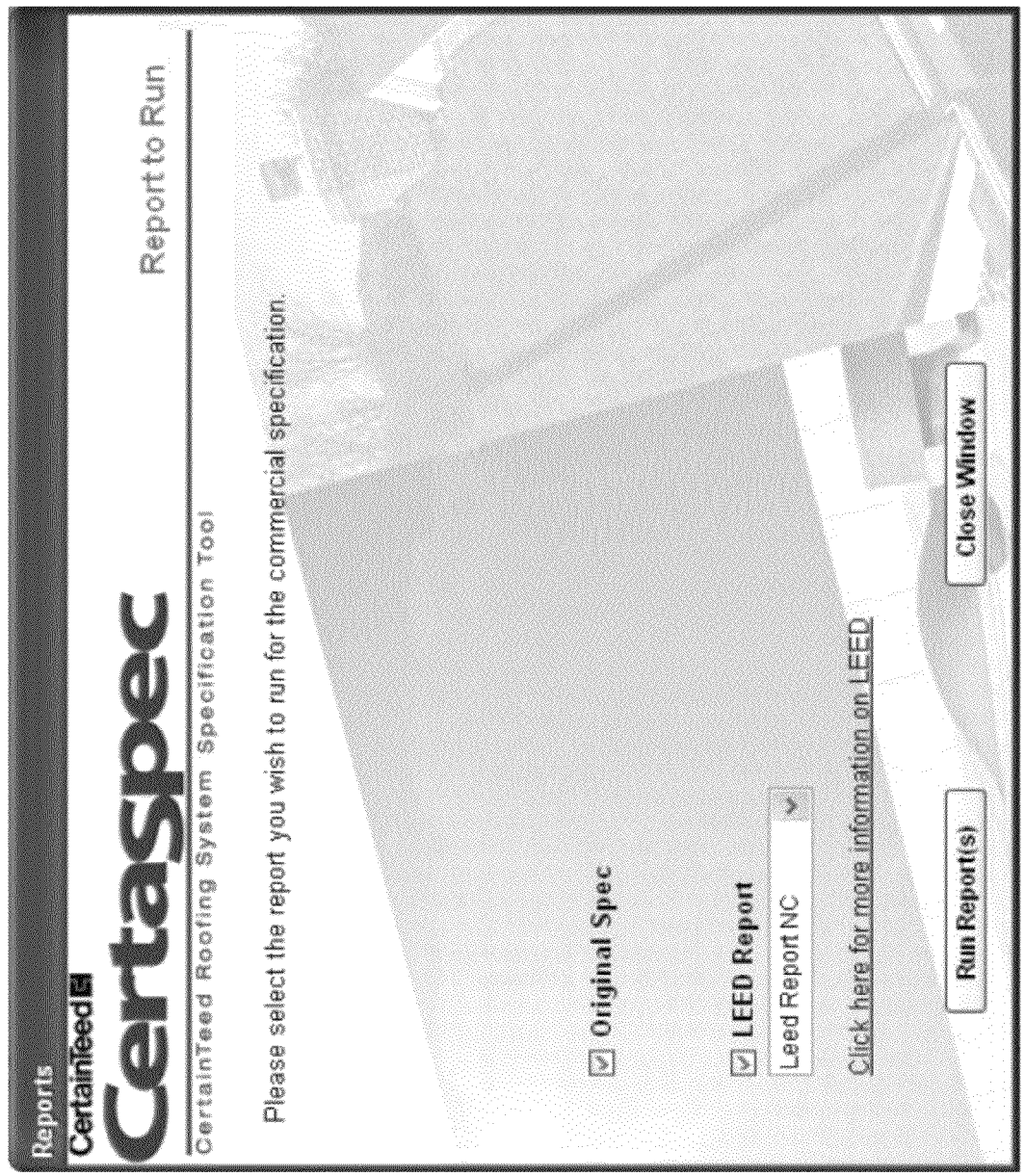
FIG. 11 is an exemplary abbreviated commercial project report screen of the disclosed system.

FIG. 11 shows an alternative version of the "Reports" screen that may be provided to a "basic" user of the system. The FIG. 11 version includes all of the options discussed in relation to the FIG. 10 embodiment, with the exception that it does not include an option for generating a "Three Part Spec." This is because the "Three Part Spec" can include a large degree of detailed technical information that is used by builders, specifiers, architects, and other higher-level users of the system. Such technical information may be of little interest to a basic user, such as a homeowner, and thus in this embodiment it is not included.

Figure 12:
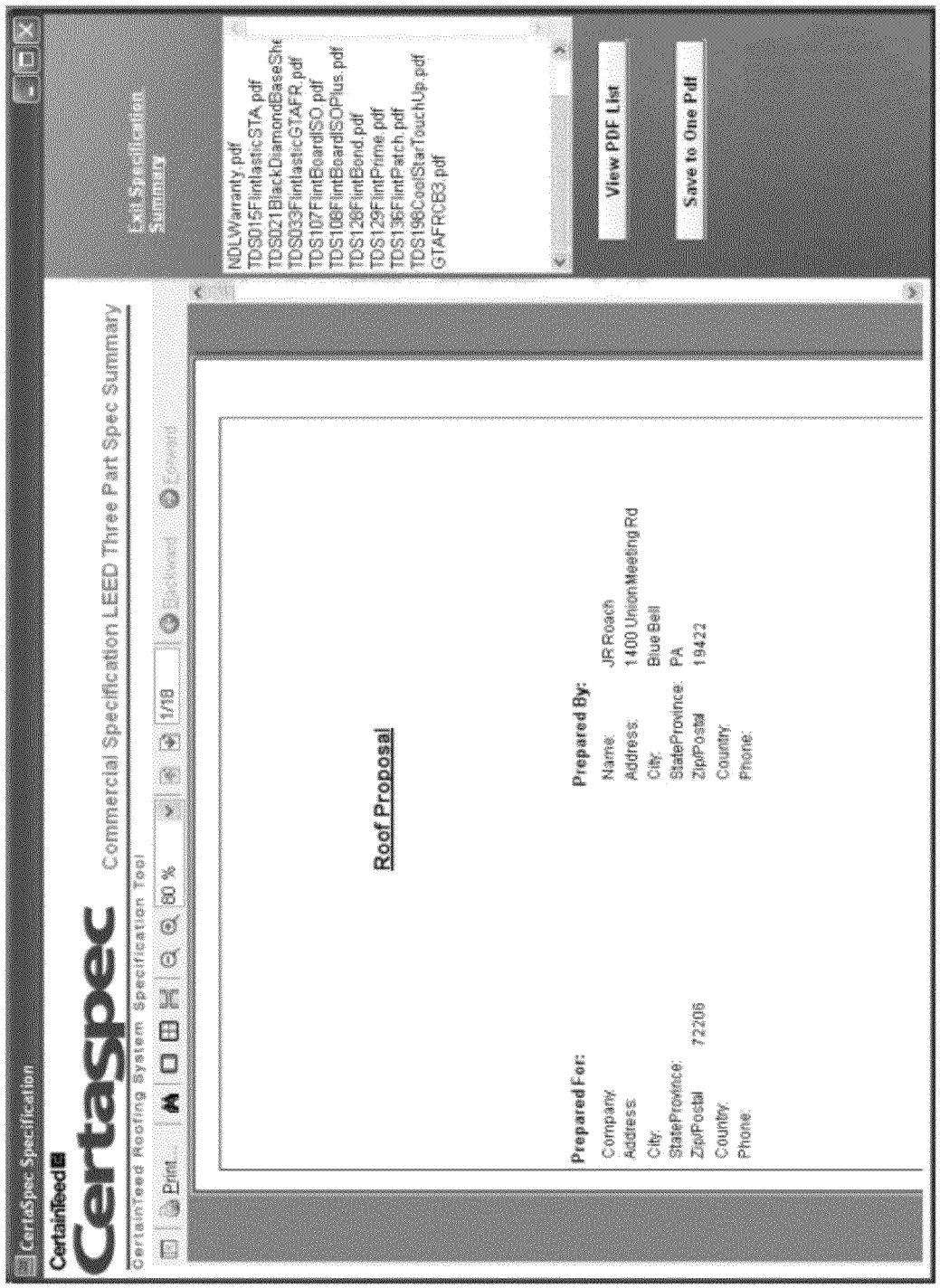
FIG. 12 is an exemplary final report screen of the disclosed system.

FIG. 12 shows an exemplary summary cover sheet for a selected LEED and Three Part Spec report. A listing of all the PDF documents supporting the specification is shown in a display box on the screen. A button, labeled "Save to One PDF" enables the user to save all of the supporting PDF files, the summary report and the LEED report (if chosen) to a single file on the user's computer desktop. If the user elected to have a Three Part Spec generated, then an additional button may be provided to enable the user to edit the Three Part Spec to add/delete/modify information contained therein. If this option is selected, a separate window will be opened in Microsoft Word, or other appropriate text editing program, and the edited Three Part Spec can be saved to the user's computer desktop.

Figure 13:
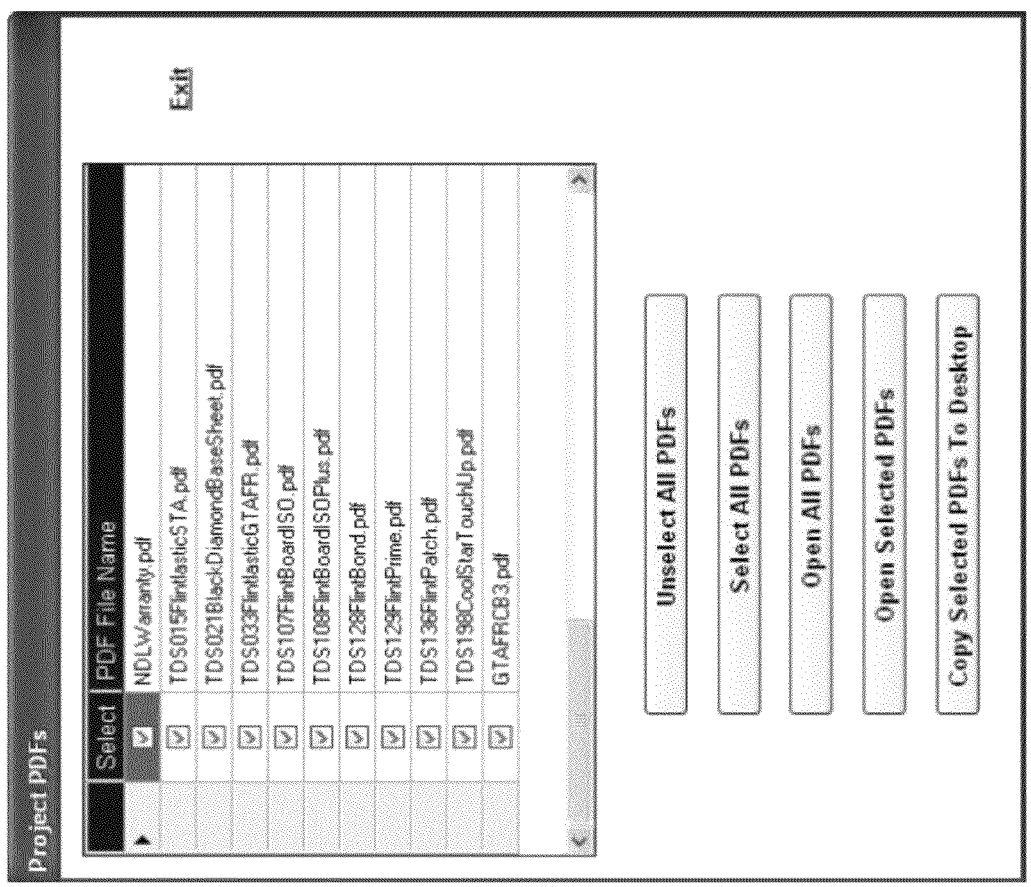
FIG. 13 is an exemplary PDF main selection screen of the disclosed system.

A "View PDF List" button is also provided adjacent to the listing of PDF documents to enable the user to view a PDF menu. Selecting this button generates an additional screen (FIG. 13) that allows the user to manipulate the PDF listing and its contents. Thus, in the FIG. 13 screen, the user can select a check box next to one or more of the PDF files. Buttons may also provided to enable the user to select all PDFs, unselect all PDFs, open all PDFs, Open selected PDFs, or copy selected PDFs to the user's desktop as individual files. An Exit button is also provided to allow the user to return to the Summary screen of FIG. 12.

Figure 14C:

An exemplary three page "Original Spec" report, generated by the system, is shown in FIGS. 14A-14C. FIG. 14A includes the Cover sheet which contains summary information about the user. FIG. 14B includes general project information, including the date the project was created, project name, product spec generated, type of project (commercial vs. residential), project creator, warranty information and the like. FIG. 14C includes roofing system information such as the type of roofing system specified, construction type (new vs. remodel), environmental information (i.e., insulation), accessories selected, and reflectance emittance information relating to the specified product. The "Original Spec" can be employed by all users as a summary page identifying the selections made on the main product/information selection screen, and can be submitted as part of a submittal package.

An exemplary "LEED Report" letter is shown in FIGS. 15A and 15B. FIG. 15A contains general information relating to LEED standards, while FIG. 15B provides product tables with associated LEED values for the specific system products associated with the selected roofing system. Specifically, for each specified product, the product tables of the LEED Report may contain information about the source plant where the product is manufactured, LEED Credit Category information regarding the product, and LEED Contribution Value for the product.

Figure 16:
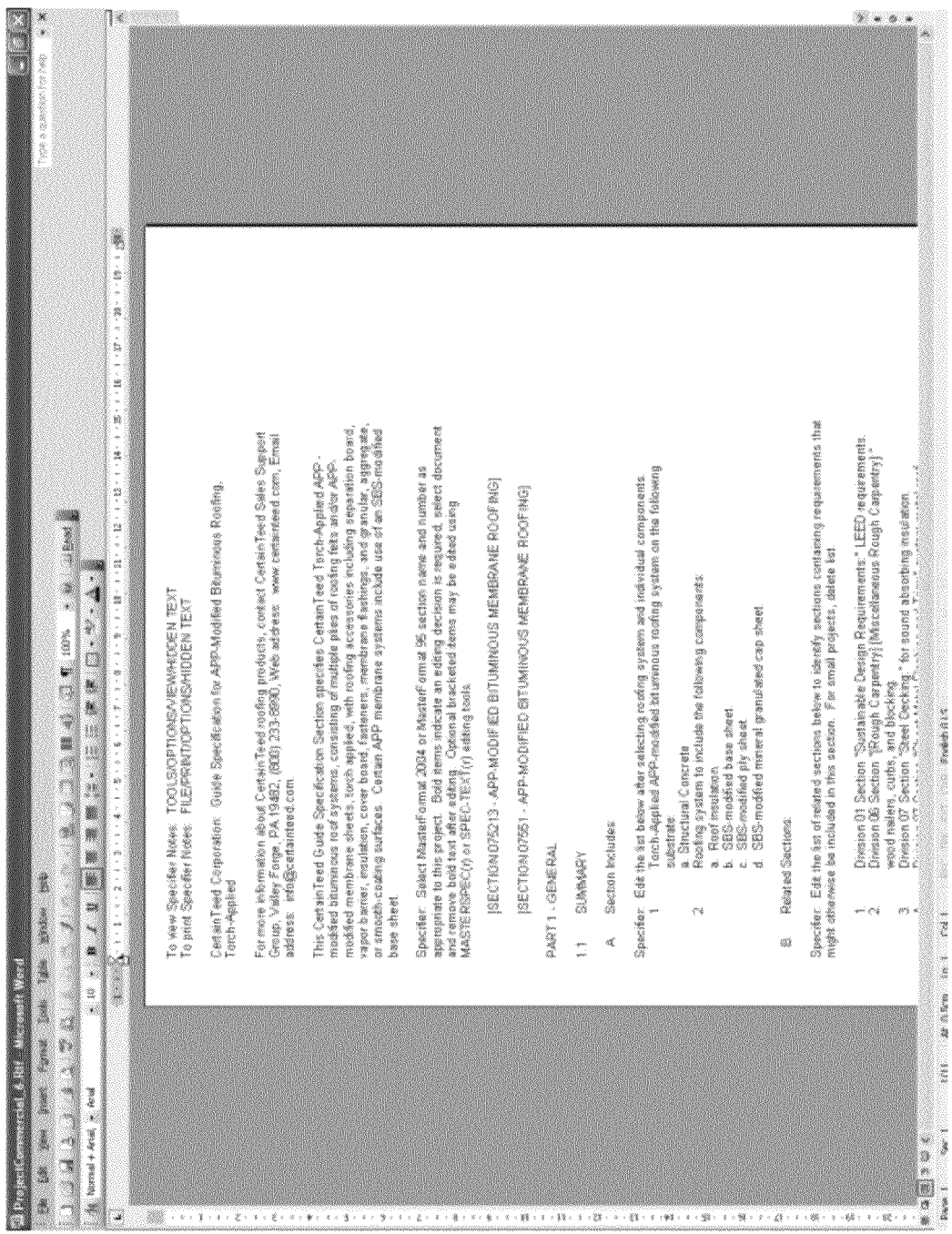
FIG. 16 is an exemplary 3-part specification generated using the disclosed system.

FIG. 16 shows an exemplary Three Part Spec. The Three Part Spec may comprise comprehensive specification information regarding all of the products included in the user's project. This specification may be used as a comprehensive specification document that includes all information required to ensure compliance with applicable product codes, and may include all project-related information required for submission to architects, building owners, specifiers, etc. During the product-selection process, the system automatically inserts specification number(s) and relevant product information including physical properties and warranty type/term into the specification template. The specification may be provided in an editable word-processing format (e.g., Microsoft Word) so that some or all of the specification information can be manually edited for content, allowing the report to be customized by the user. Thus, the Three Part Spec may contain a variety of detailed technical information regarding each of the individual products included as part of a selected roofing (or other building project) system, including but not limited to relevant physical properties of product components and detailed warranty information regarding the products.

Figure 17:
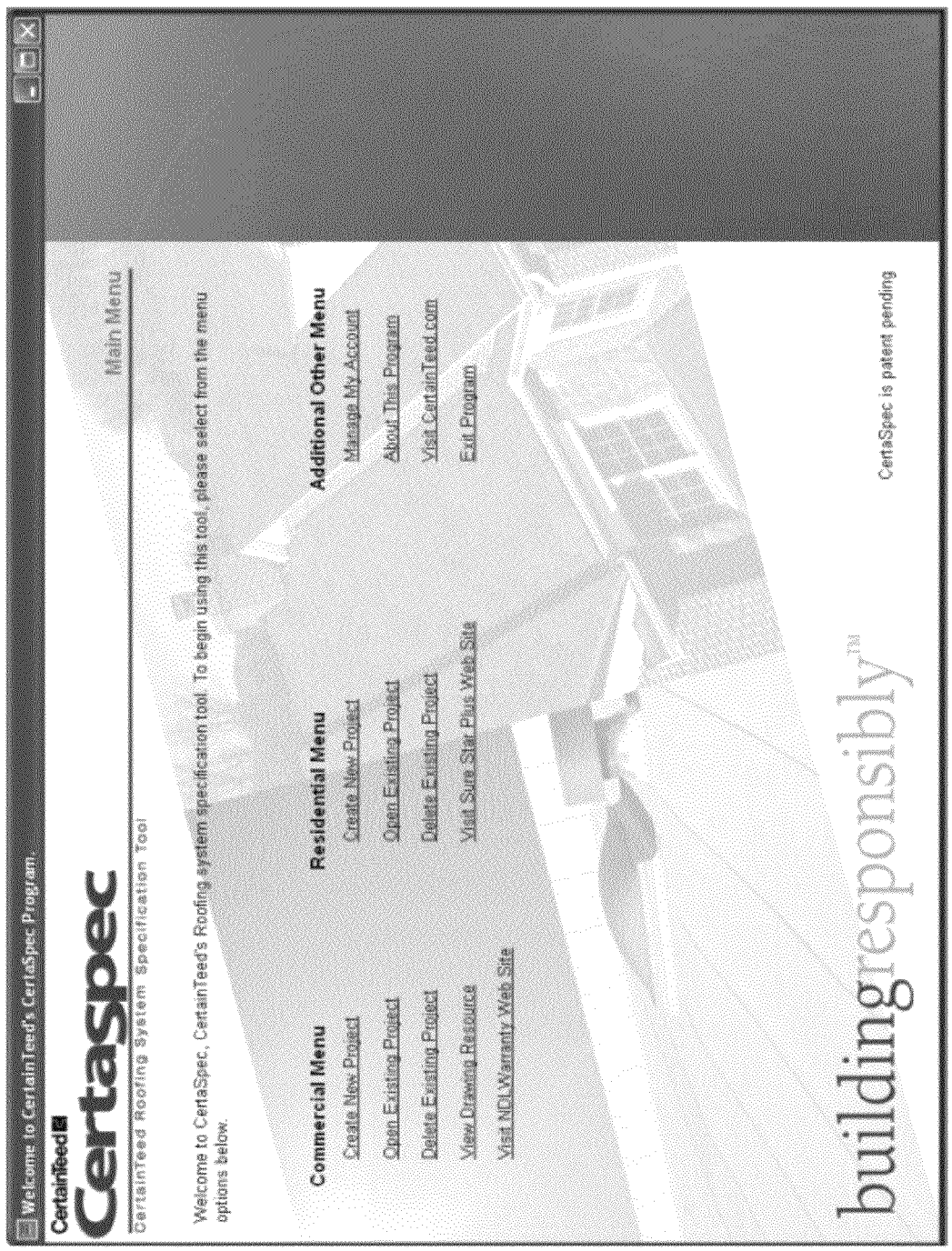
FIG. 17 is an exemplary main menu screen of the disclosed system enabling users to select between different project types.
Figure 18:
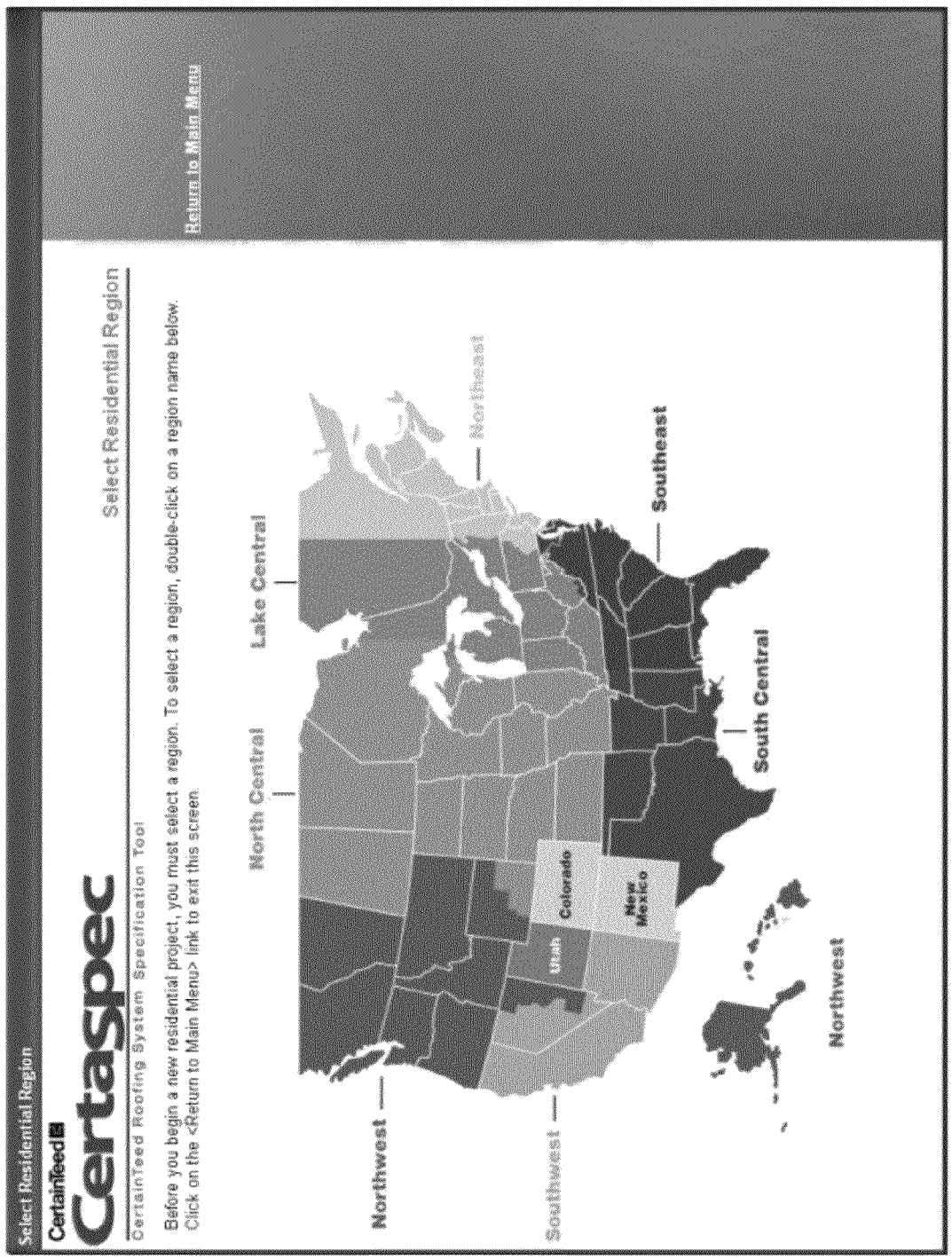
FIG. 18 is an exemplary residential map selection screen of the disclosed system.

Referring now to FIG. 17, the residential project selection process will be described in greater detail. To begin, the user may select the "Create New Project" option under the Residential Menu heading. In response to this selection, the system may generate a "Select Residential Region" screen (FIG. 18), which appears as a map of the United States divided up into a plurality of color-coded geographic regions. Since certain residential products may only be available in certain geographic regions, this screen can serve to limit the display of qualifying residential products to those available in the selected region. To continue with a new project, the user can simply click on the geographic region in which the project will be located.

Figure 19:
FIG. 19 is an exemplary main residential project selection screen of the disclosed system.

A "New Residential Project" screen may then appear (FIG. 19). Similar to the commercial embodiment, a variety of selectable features are provided on the FIG. 19 screen, including links or drop-downs at the top of the screen that enable the user to access a SureStart Plus website (for obtaining product warranty information), or to contact the system administrator and/or appropriate sales support personnel in the manner previously described in relation to the commercial project embodiment.

In the FIG. 19 screen, the user can add or modify information regarding the project by clicking the "Edit" link next to the "Project Information" heading. Appropriate information can then be selected from any of the entries provided under the "Select Roofing Specifications," heading. Such selections are shown as drop-down menu selections, though other known methods of inputting such information may also be used.

In the illustrated embodiment, the user can select from Warranty Programs and Terms, Construction type (new construction, remodel), whether a wind warranty is desired, whether a ventilation system is desired, deck type, deck type slope, underlayment, whether impact resistance is desired, whether algae resistance is desired, which ridge accessories are desired, starter type, and product category.

A product tally display is also provided (shown on the right hand side of the screen), which includes a listing of all products (in this case a listing of the roofing systems) that meet the user-entered selections from the pre-defined fields. At the outset, it can be seen that 16 individual products/systems are displayed (FIG. 19). As selections are made from within the predefined fields, the number of products listed in the product tally display decreases so that only those products that meet the user's selected criteria remain displayed. Thus, the user selections result in two product specifications being displayed (FIG. 20) as meeting the project criteria entered by the user.

Figure 20:
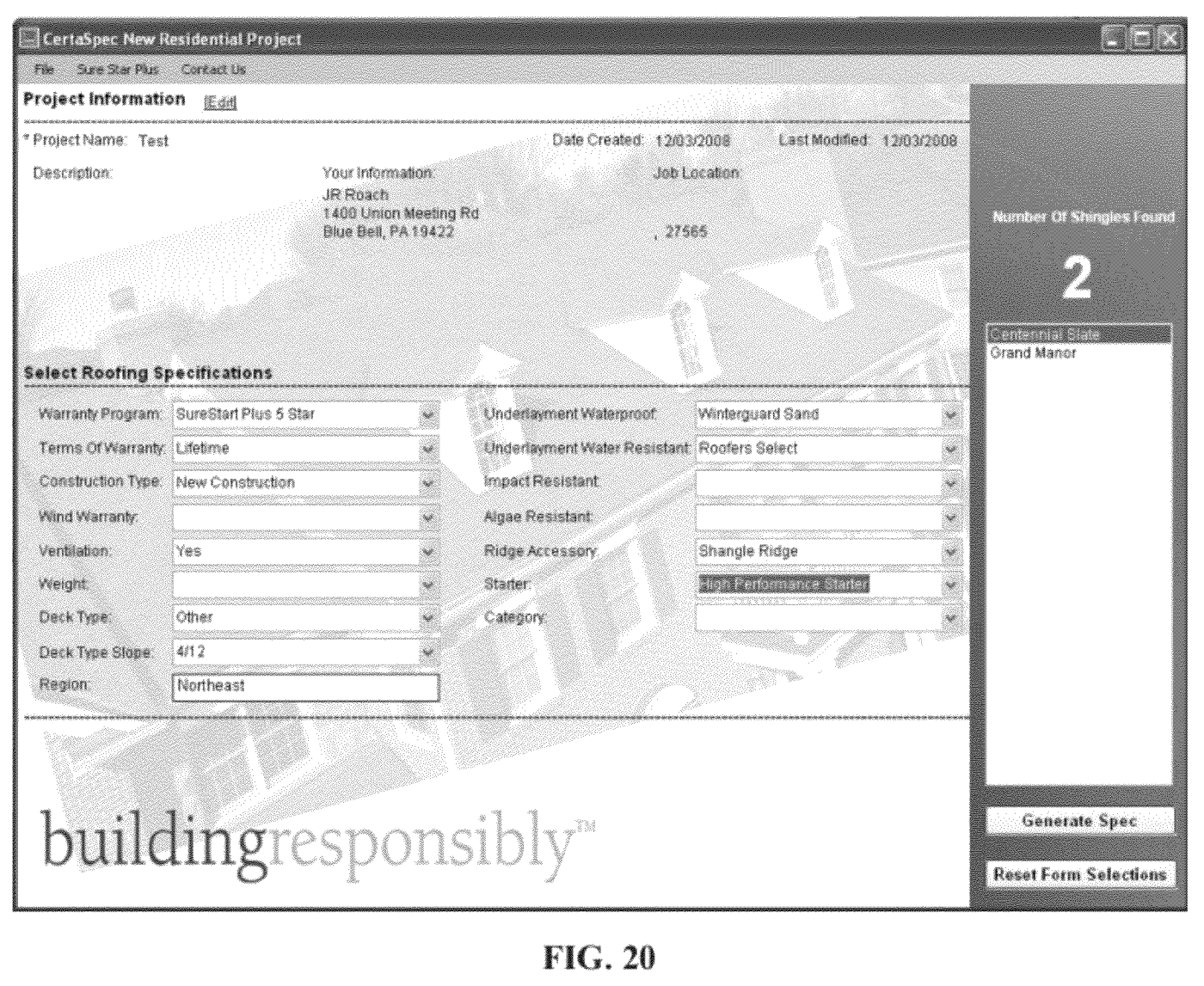
Figure 21:
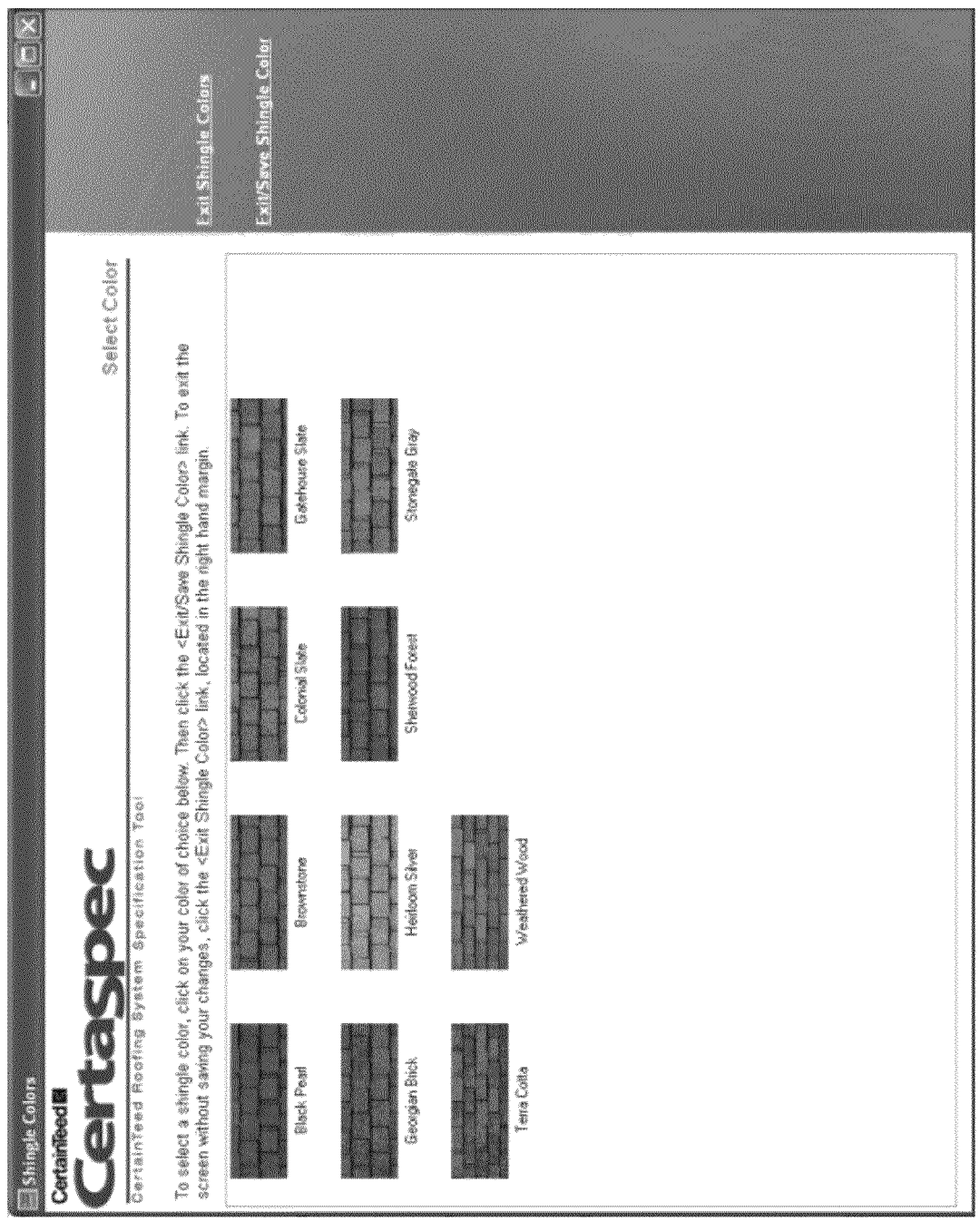
FIG. 21 is an exemplary residential roofing shingle color selection screen of the disclosed system.

As certain fields are selected, other fields may automatically become unavailable for selection until only those products and/or systems that best fit the user's selected criteria are shown. The user may double click or otherwise select one of the displayed products, whereupon a new screen (FIG. 21) may be displayed showing an additional levels of product specific detail. In the illustrated embodiment, a plurality of shingle color sections are shown on the screen, from which the user can select a desired color by clicking on the appropriate shingle icon, then clicking "Exit/Save Shingle Color" button provided on the right-hand portion of the screen. The user may alternatively select the "Exit Shingle Colors" button to exit the screen without saving a shingle color and to return to the previous screen (FIG. 20).

Upon returning to the New Residential Project screen (FIG. 20), the user can change any of the selections made to this point by selecting the "Reset Form Selections" button. Alternatively, the user can choose to generate a project specification by selecting the desired specification shown in the specification listing and then selecting the "Generate Spec" button.

Figure 22:
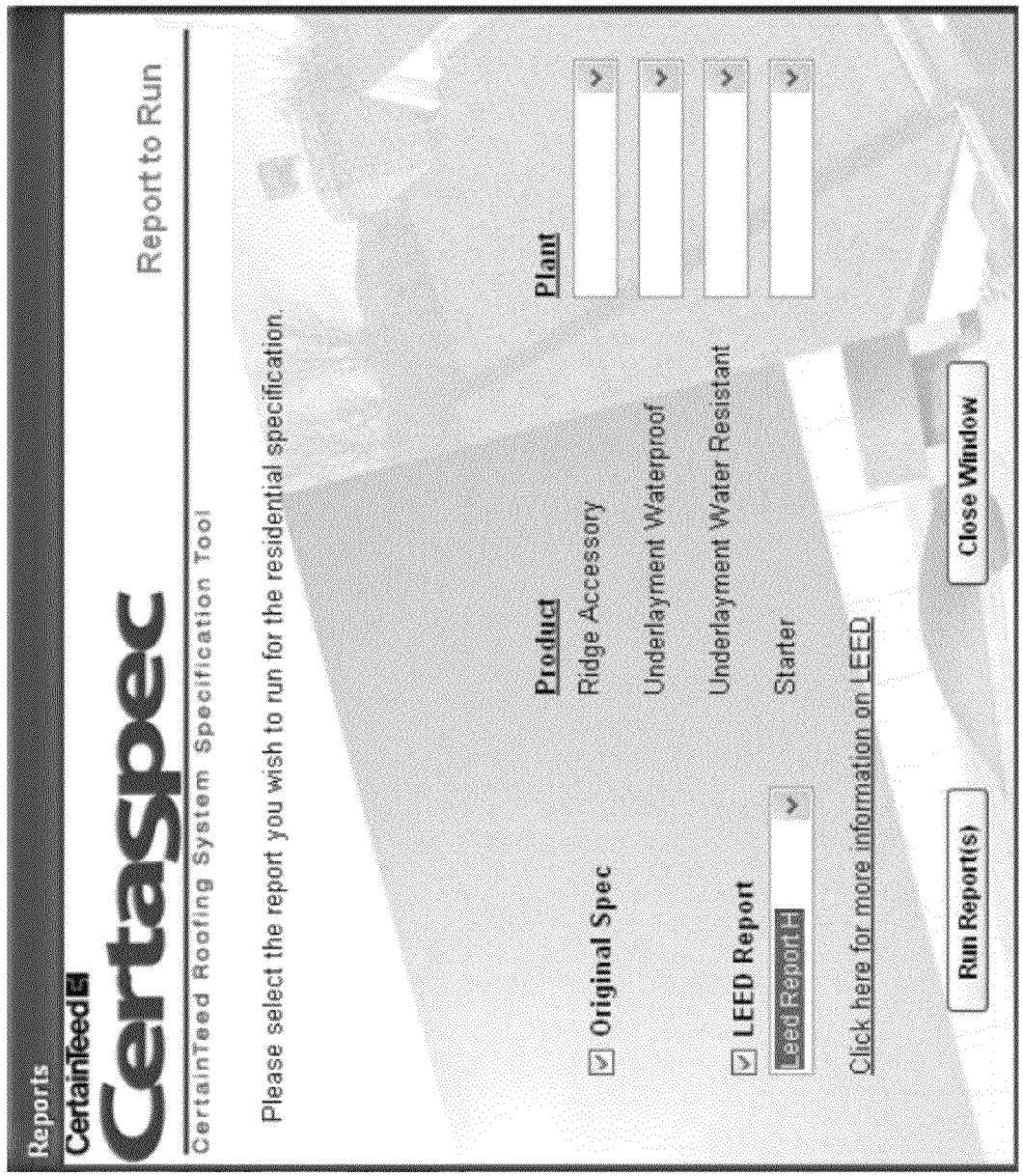
FIG. 22 is an exemplary residential project report screen of the disclosed system.

When the "Generate Spec" button is clicked, a "Reports" screen, shown in FIG. 22, is generated. This screen enables the user to choose from a variety of reporting options. In the illustrated embodiment, the user is provided the option of selecting an "Original Spec." and a "LEED Report." Although not shown, a "Three Part Spec" selection option may also be provided. Three part spec button is currently used only by internal CT employees but will be released to all users eventually. One or more of these options can be selected in the manner previously described in relation to the commercial project embodiment.

If the "LEED Report" option is selected (LEED CS, LEED EB, LEED NC, or LEED H), then product boxes will appear. In the illustrated embodiment, product boxes appear adjacent to the products "Ridge Accessory," "Underlayment Waterproof," "Underlayment Water Resistant," and "Starter." Each product box can be used to enable the user to adjust and/or specify the source plant for the associated product to maximize the total number of LEED points for the project. As with the commercial embodiment, it will be appreciated that NAHB selections may be provided in addition to, or as an alternative to, LEED selections to enable the user to generate one or more NAHB reports.

A "Close Window" button is provided to enable the user to return to the previous screen to modify any previous selections (FIGS. 20, 21) and run a report. Once the final report selections are made, the "Run Report(s)" button may be selected to generate the desired report(s).

Figure 23:
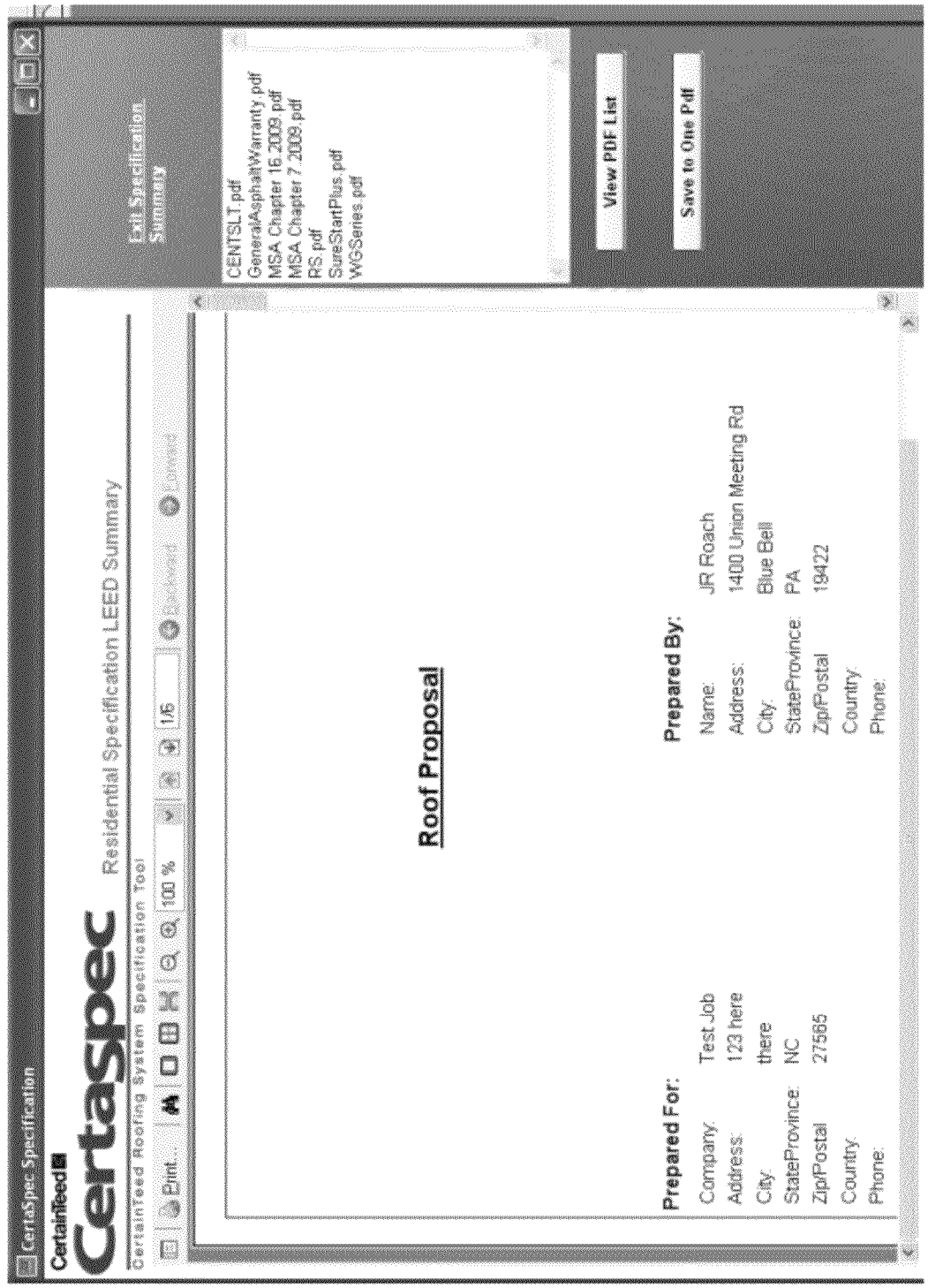
FIG. 23 is an exemplary residential roof project proposal cover sheet generated using the disclosed system.

FIG. 23 shows an exemplary summary cover sheet for a selected residential Roof Proposal specification. A listing of all the PDF documents supporting the specification is shown in a display box on the screen. A button, labeled "Save to One PDF" enables the user to save all PDF files, the summary report and the LEED report (if chosen) to a single file on the user's computer desktop. If the user has elected to have a Three Part Spec generated, then an additional button may be provided to enable the user to edit the Three Part Spec to add/delete/modify information contained therein. If this option is selected, a separate window will be opened in Microsoft Word, or other appropriate text editing program, and the edited Three Part Spec can be saved to the user's computer desktop.

Figure 24:
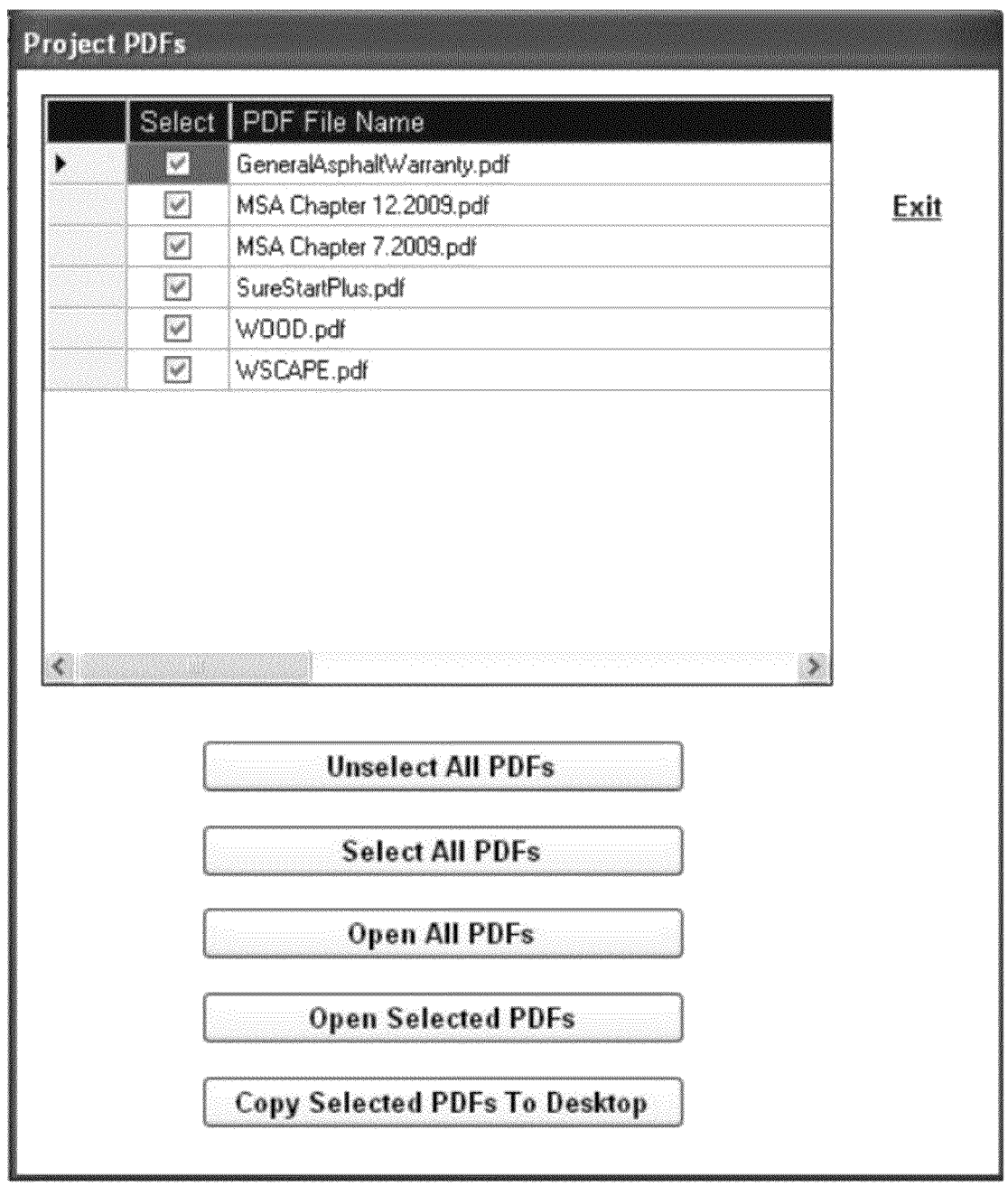
FIG. 24 is an exemplary PDF main selection screen of the disclosed system.

A "View PDF List" button is provided adjacent to the listing of PDF documents to enable the user to view a PDF menu. Selecting this button generates an additional screen (FIG. 24) that allows the user to manipulate the list and its contents. Thus, in the FIG. 24 screen, the user can select or unselect a check box next to one or more of the PDF files. Buttons are also provided to enable the user to select all PDFs, unselect all PDFs, open all PDFs, Open selected PDFs, or Copy selected PDFs to the user's desktop as individual files.

An Exit button is also provided to allow the user to return to the Summary screen of FIG. 23.

Figure 25B:

An exemplary three page "Original Spec" report is shown in FIGS. 25A-25C. FIG. 25A includes the Cover sheet which contains summary information about the user. FIG. 25B includes general project information, including the date the project was created, project name, product spec generated, type of project (residential), project creator, warranty information and the like. FIG. 25C includes roofing system information such as the type of roofing system specified, construction type (new vs. remodel), environmental information (i.e., insulation), accessories selected, and reflectance emittance information relating to the specified product.

An exemplary "LEED Report" letter is shown in FIGS. 26A and 26B. FIG. 26A contains general information relating to LEED standards, while FIG. 26B provides product tables with associated LEED values for the specific system products associated with the selected roofing system.

As previously noted, a Three Part Spec may be generated for a Residential project in a manner similar to that described in relation to the Commercial project embodiment. The Three Part Spec may be provided in an editable form to enable the user to customize the specification to meet the particular needs of the project.

Figure 27:
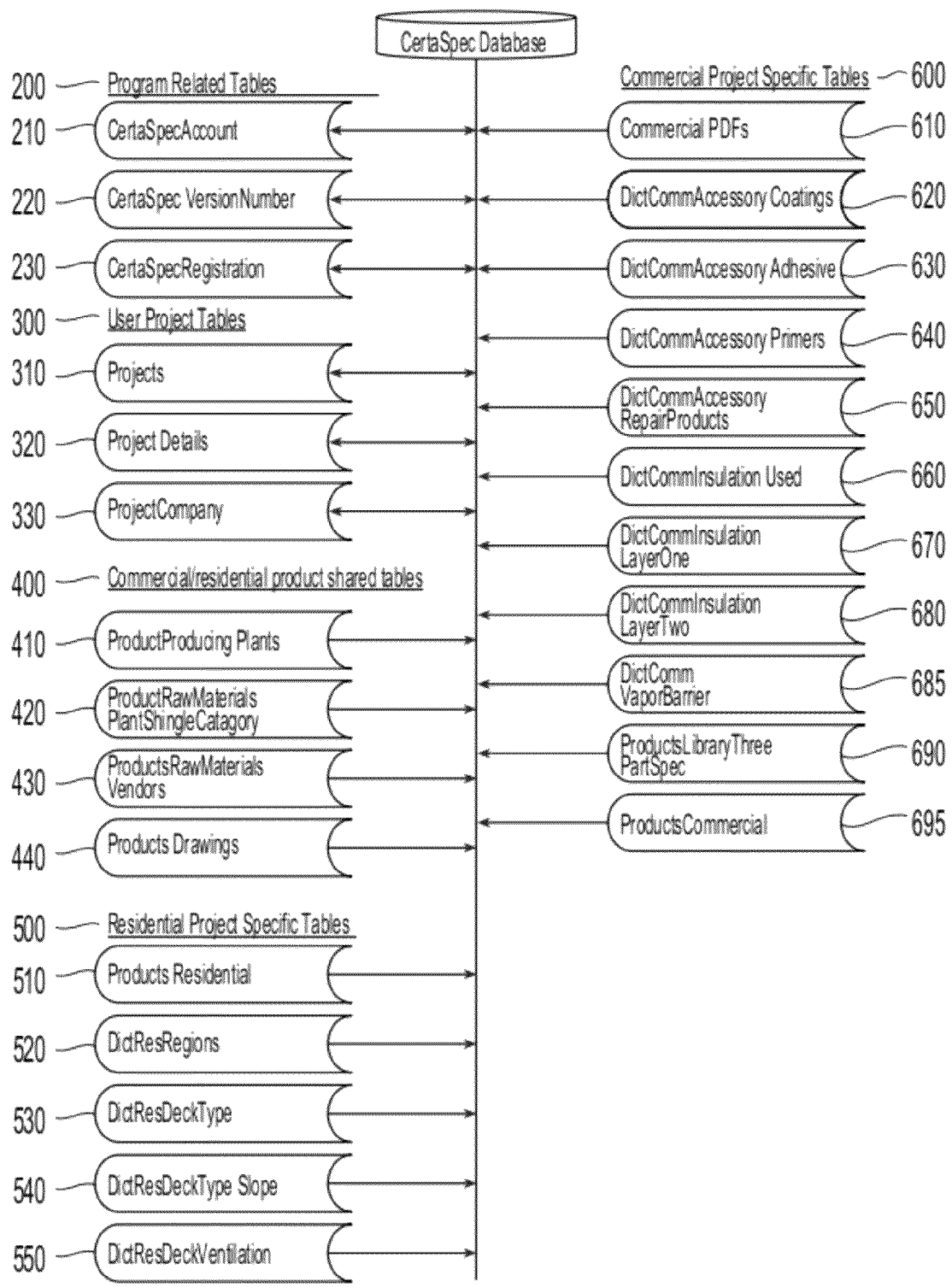
FIG. 27 illustrates the structure of an exemplary database for use as part of the disclosed system.

Referring now to FIG. 27, a database structure is shown illustrative of an exemplary database for use as part of the disclosed system. Thus, database 100 is provided, and may consist of a plurality of individual tables, including Program Related Tables 200, User Project Tables 300, Commercial/Residential Product Shared Tables 400, Residential Product specific Tables 500, and Commercial Product Specific Tables 600.

In one embodiment, the program related tables 200 include a CertaSpecAccount file 210, which contains user account information, name and address. This information is used when a residential or commercial project is first created. A CertaSpecVersionNumber file 220 may contain the latest CertaSpec program release number and a series of fields used in the update process. A CertaSpecRegistration file 230 may contain the user's registration information, which includes account information and a description of the user's occupation. This information may be sent to a company website (e.g., CertaSpec ftp site) for use in sales and marketing databases.

In one embodiment, the user project tables 300 include a projects table 310, which contains a macro view (i.e., overview) of a project. This file may used for both commercial and residential projects. A ProjectDetails file 320 may contain the detail view (i.e., specific product technical details) of a project. This file may also used for both commercial and residential projects. A ProjectCompany file 330 may contain a user's list of companies to which a CertaSpec project has been sold.

The commercial/residential product shared tables 400 may have a ProductsProducingPlants file 410 that contains a list of CertaSpec manufacturing plants by region and zip code. A ProductsRawMaterialsPlantShingleCategory file 420 may contain a breakdown by commercial product or residential shingle of the product's components and the component's content percentage of the product. A ProductsRawMaterialsVendors file 430 may contain a list of vendors who manufacture the component used in commercial and residential products eligible for LEED consideration. The vendor's zip code may be stored in this file. A ProductsDrawings file 440 may contains a list of drawing file names used in the drawings display form (FIGS. 12, 13, 23 & 24).

The Residential Project Specific Tables 500 may include a ProductsResidential file 510 that contains a list by shingle, color, producing plant and region of CertaSpec products used to build a residential project. A DictResRegions file 520 may contain a list of residential region names. A DictResDeckType file 530 may contain a list of residential deck types. A DictResDeckTypeSlope file 540 may contain a list of residential deck type slopes. A DictResVentilation file 550 may contain a Yes and No record used in the residential project construction to indicate whether ventilation has been selected for the project.

The Commercial Project Specific Tables 600 may include a CommercialPDFs file 610 may contain a list of commercial PDF file names associated with a commercial project's components. A DictCommAccessoryCoatings file 620 may contain a list of accessory coatings used in building a commercial project. A DictCommAccessoryAdhesive file 630 may contain a list of accessory adhesives used in building a commercial project. A DictCommAccessoryPrimers file 640 may contain a list of accessory primers used in building a commercial project. A DictCommAccessoryRepairProducts file 650 may contain a list of accessory repair products used in building a commercial project. A DictCommInsulationUsed file 660 may contain a Yes and No record used in the commercial project construction. If yes is selected, the user may be prompted to make a selection in the insulation section as to insulation type and size. If no is selected, the field may remain inactive. A DictCommInsulationLayerOne file 670 may contain a list of insulation types used in the commercial project construction. A DictCommInsulationLayerTwo file 680 may contain a list of insulation types used in the commercial project construction. A DictCommVaporBarrier file 685 may contain a Yes and No record used in the commercial project construction. A ProductLibraryThreePartSpec file 690 may contain a list of substitution phrases used in constructing the commercial three part spec document. A ProductsCommercial file 695 may contain a list by spec of CertaSpec products used to build a residential project.

The system and method described herein may be automated by, for example, tangibly embodying a program of instructions upon a computer readable storage media, capable of being read by machine capable of executing the instructions. A general purpose computer is one example of such a machine. Examples of appropriate storage media are well known in the art and would include such devices as a readable or writeable CD, DVD, flash memory chips (e.g., thumb drive), various magnetic storage media, and the like.

In one embodiment, the system may be loaded onto a flash drive or other removable or portable media, enabling the user to transport the system to a job site that may not be equipped with an Internet connection. The user can then make selections or changes to selections on the spot, allowing the system to provide specification or other information to the user immediately, without the need for Internet connectivity.

Exemplary Technical Specifications:

Type: Desktop/Laptop Application

Platforms: Microsoft Windows (98, 98SE, ME, 2000, NT, XP, XP SP2, VISTA); or Macintosh, Linux or other environment Hardware: PC 533 Mhz Processor, 512 Mb Ram Software: Adobe Acrobat or Adobe Reader to view PDFs.

Software: CAD or other image software to view drawings.

Software: Macromedia Flash component to view tutorial

Languages: Microsoft Visual Basic 6, Microsoft Visual Basic .NET

Databases: Microsoft Access 2000, Microsoft SQL 2000

Languages: Microsoft Visual Basic 6, Microsoft Visual Basic .NET.

Databases: Microsoft Access 2000, Microsoft SQL 2000

In yet another embodiment, the system may be loaded onto a handheld device, a non-limiting exemplary list of such devices including Palm Treo, Blackberry, cellular telephone, or a custom handheld device. The display format provided by the system may be modified accordingly to suit the reduced screen sizes often associated with such handheld devices. With such embodiments, the system may be provided via wireless download, or by linking via hardwire to a desktop or laptop having the system loaded thereon. A customized mobile version of the system may be provided to facilitate one or more of the aforementioned features.

Figure 28A:
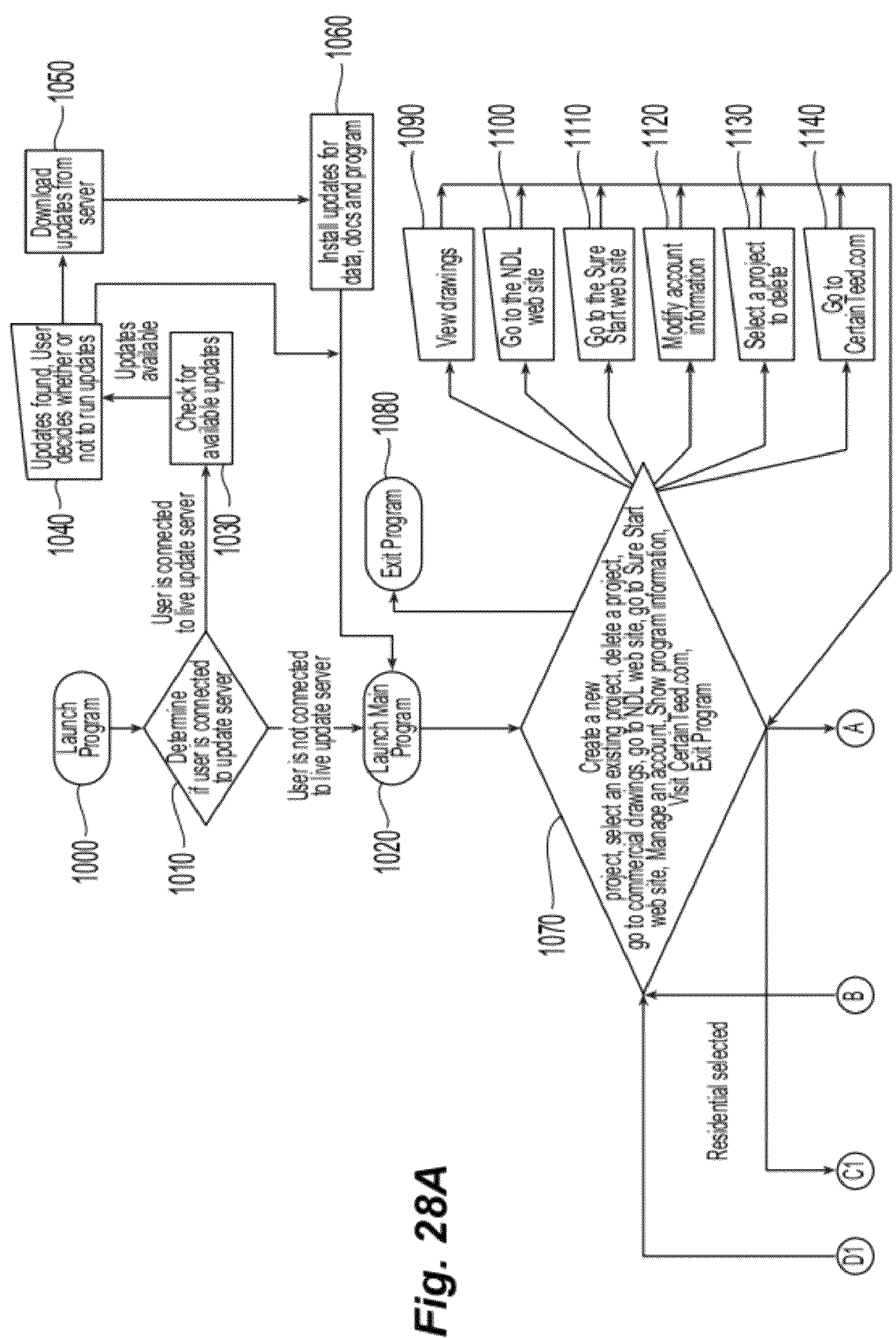
FIGS. 28A-C illustrate a user process flowchart of the disclosed system.
Figure 28B:
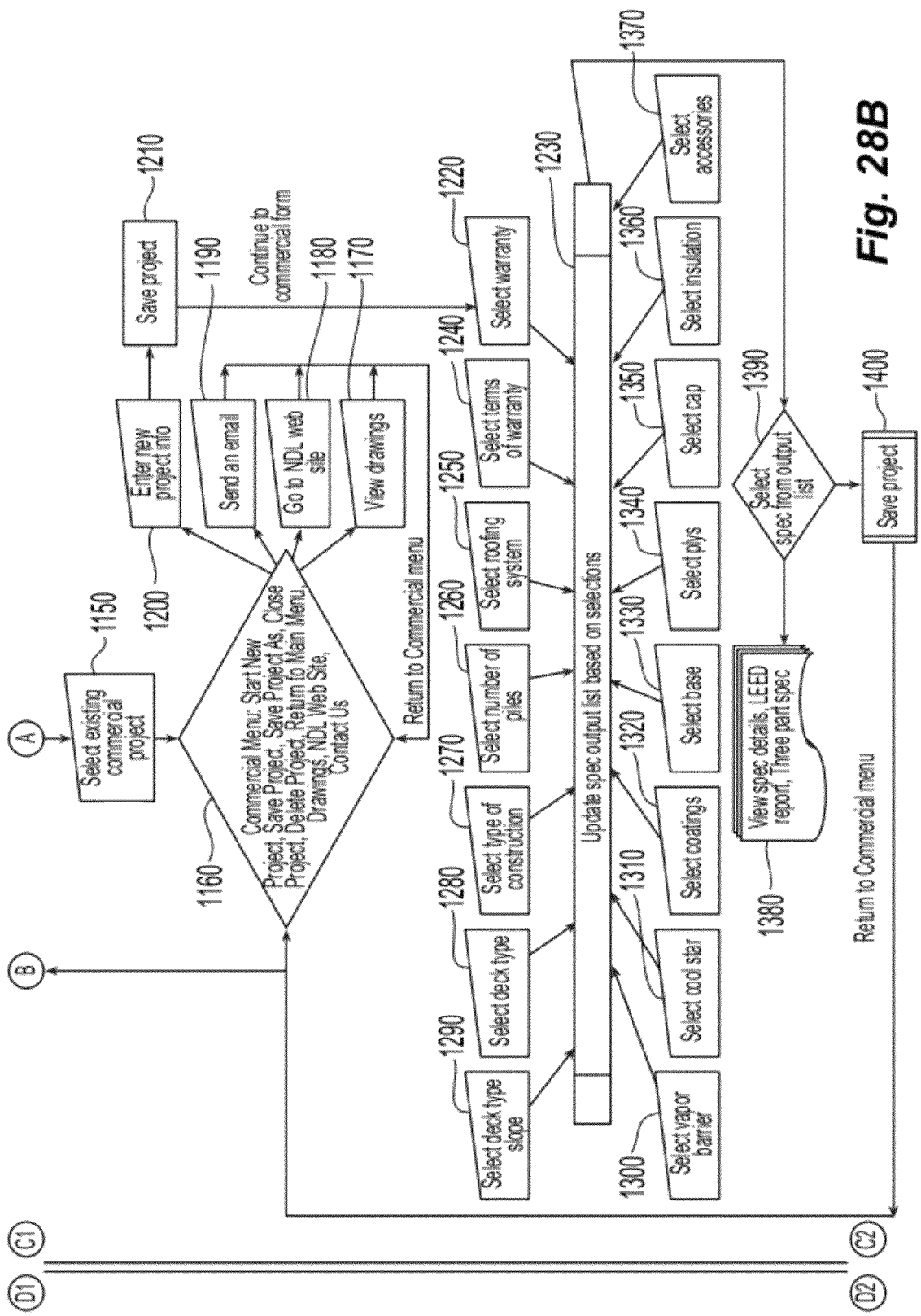
Figure 28C:
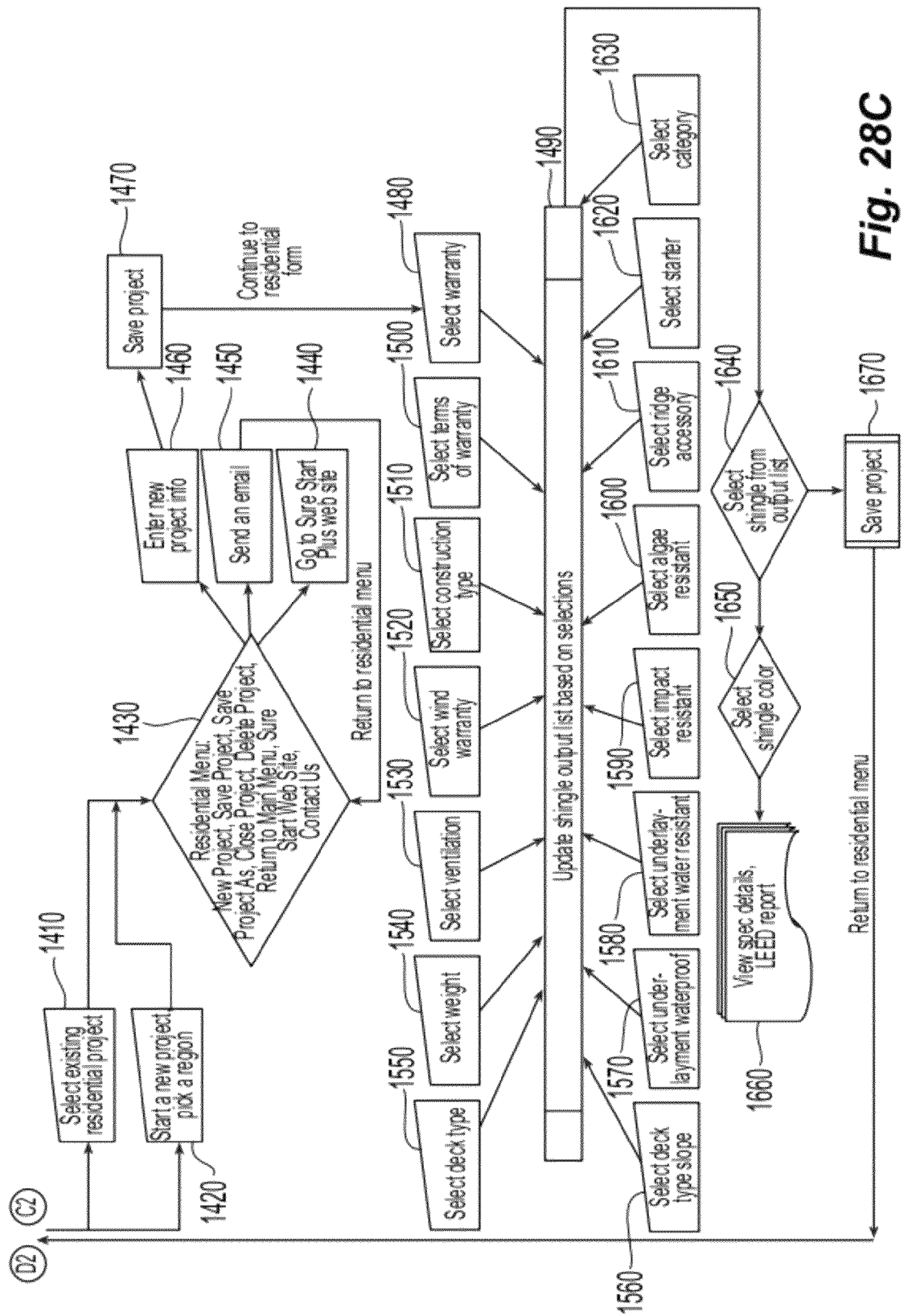

Referring now to FIGS. 28A-28C, a user process will be described in greater detail. It will be appreciated that although this exemplary user process flow is tailored to a roof construction project, the system is not so limited. Thus, the disclosed system can be adapted for use in any of a wide variety of applications that relate to residential or commercial building construction and renovation.

At step 1000, a user launches the system (i.e., the program). At step 1010, the system determines if the user is connected to an update server. If the user is not connected to an update server, then the system proceeds to launch the main program at step 1020.

If, however, the user is connected to an update server, then at step 1030 the system connects to the update server and checks the server for available product updates. If updates are not available, the system proceeds to launch the main program (step 1020). If, however, updates are available, then at step 1040 the user is queried to determine whether they would like to run the updates. If the user elects not to run live updates, the system returns to the launch main program step (step 1020). If the user does elect to run live updates, then at steps 1050 and 1060 the updates (including data, documents and applicable programs) are downloaded and installed on the user's computer. The system then proceeds to the launch main program step (step 1020).

At step 1070, the main program loads system data and presents the main menu to the user, enabling the user to select between creating a new project, selecting an existing project, deleting a projecting, linking to a commercial drawings website, linking to a warranty information website (NDL, SureStart), managing an account, showing program information, visiting a manufacturer's website (Certainteed.com) or exiting the program. If the user elects to view drawings, the program proceeds to step 1090, and returns to step 1070 when the user is finished. If the user elects to visit the NDL website (commercial product warranty information), the program proceeds to step 1100, and returns to step 1070 when the user is finished. If the user elects to visit the SureStart website (residential product warranty information), the program proceeds to step 1110, and returns to step 1070 when the user is finished. If the user elects to modify account information, the program proceeds to step 1120, and then returns to step 1070 when the user is finished. If the user elects to select a project to delete, the program proceeds to step 1130, and returns to step 1070 when the user is finished. If the user elects to visit a manufacturer's web site (Certainteed.com), the program proceeds to step 1140, and returns to step 1070 when the user is finished.

If the user chooses to exit the program at this point, the program proceeds to step 1080 where it ends. If, however, the user selects a new or existing commercial project, then the program proceeds to step 1150 (FIG. 28B) in which an existing commercial project is selected, or step 1160 in which a new commercial project is opened. At step 1160, the user can start a new project, save a project, close a project, delete a project, return to the main menu, view drawings, link to a warranty (NDL) website, or contact the system administrator and/or sales support representative. If the user elects to view drawings, at step 1170 the drawings can be viewed. When the user is finished viewing drawings, the program returns to step 1160, where additional options may be selected. If the user elects to visit the warranty (NDL) website, at step 1180 a link is provided to the website. When the user is finished viewing the website, the program returns to step 1160, where additional options may be selected. If the user elects to send an e-mail, then at step 1190 an e-mail message is generated. When the user sends the e-mail message, the program returns to step 1160, where additional options may be selected. If the user elects to enter new project information, at step 1200 the user is prompted to enter new project information. Thereafter, the user can save the project at step 1210 and continue to the commercial form. At the commercial form, a variety of input steps are supported, such as step 1220 in which the user can select a warranty. After each input step, the commercial specification is updated (step 1230) based on the input information. Other user selection steps are also provided, including selection of a warranty term (step 1240), roofing system (step 1250), number of roofing plies (step 1260), type of construction (new vs. renovation) (step 1270), deck type (step 1280), deck type slope (step 1290), vapor barrier (step 1300), whether a reflectant surface (e.g., CoolStar™) will be used (step 1310), a coating (step 1320), a base material (step 1330), a number of base plies (step 1340), a cap material (step 1350), insulation (step 1360), and accessories (step 1370). It will be appreciated that at each of these steps, upon input of the relevant selection by the user, the listing of building products/systems is reduced so that only those building products/systems that satisfy the selection criteria are displayed on the selection screen.

Once these selections are made, the user can select and/or view a specification (Original Specification, LEED report, Three Part Spec) from an output list 1380 at step 1390. The user can save the project at step 1400, whereupon the program returns to the commercial menu at step 1160. If finished with the session, the user can return to the main menu at step 1070.

In lieu of a commercial project, at step 1070 the user can select a residential project within the main menu, whereupon the program proceeds to step 1410 (existing residential project) or step 1420 (start a new project, pick a region), depending upon the user's selection. The program then proceeds to the residential menu at step 1430, where the user can start a new project, save a project, close or delete a project, return to the main menu, visit the SureStart (warranty) web site, or contact the system administrator and/or sales support representative. If the user elects to visit the warranty (SureStart) website, then at step 1440 a link is provided to the website. When the user is finished viewing the website, the program returns to step 1430, where additional options may be selected. If the user elects to send an e-mail, then at step 1450 an e-mail message is generated. When the user sends the e-mail message, the program returns to step 1430, where additional options may be selected. If the user elects to enter new project information, at step 1460 the user is prompted to enter new project information. Thereafter, the user can save the project at step 1470 and continue to the residential form. At the residential form, a variety of input steps are supported, such as step 1480 in which the user can select a warranty. After each input step, a shingle output list is updated, at step 1490, based on the input information. Specifically, at each of these steps, upon input of the relevant selection by the user, the listing of building products/systems is reduced so that only those building products/systems that satisfy the selection criteria are displayed on the selection screen. Other user selection steps are also provided, including selection of a warranty term (step 1500), construction type (step 1510), wind warranty (step 1520), ventilation (step 1530), weight (step 1540), deck type (step 1550), deck type slope (step 1560), underlayment waterproof (step 1570), underlayment water resistant (step 1580), impact resistance (step 1590), algae resistance (step 1600), ridge accessories (step 1610), starter (step 1620), and category (step 1630). After each selection step the shingle output list may be updated at step 1490.

Once these selections are made, the user can select a shingle from an output list at step 1640. The user may select a shingle color at step 1650 and/or view specification details and LEED report information as appropriate at step 1660. The user can then save the project at step 1670, whereupon the program returns to the commercial menu at step 1160. If finished with the session, the user can then return to the main menu at step 1070.

As previously noted, this exemplary flow chart describes the process in relation to an exemplary roofing product selection flow, and it will be appreciated that the process can be applied to the selection of any of a variety of building project types.

The system and method described herein may be implemented by, for example, tangibly embodying a program of instructions upon a computer readable storage media, capable of being read by machine capable of executing the instructions. A general purpose computer or laptop are two non-limiting examples of such a machine. Examples of appropriate storage media are well known in the art and would include such devices as a readable or writeable CD, flash memory chips (e.g., thumb drive), various magnetic storage media, and the like.

The functions and process steps herein may be performed automatically or wholly or partially in response to user command. An activity (including a step) performed automatically is performed in response to executable instruction or device operation without user direct initiation of the activity.

The systems and processes of FIGS. 1-28C are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

In addition, the processes and applications may, in alternative embodiments, be located on one or more (e.g., distributed) processing devices accessing a network linking the elements of the system. Further, any of the described functions and steps may be implemented in hardware, software or a combination of both and may reside on one or more processing devices located at any location of a network linking the elements of the system or another linked network, including the Internet.

Thus, while the system has been described in relation to an embodiment in which an executable program is downloaded onto a computer (desktop, laptop, handheld) via the Internet or removable media, it will be appreciated that one or more aspects of the system may be hosted on a website accessible via the Internet. In one embodiment, the system may be provided in an Internet browser format having all of the previously described selection and report generation features.

Additionally, while the system and method of the invention have been described in relation to roofing applications, it will be understood that the systems and methods can be implemented for other types of building material applications, such as for example, building materials including, but not limited to, exterior building products, interior building products, building product systems, and materials used in construction projects. Building materials include roofing, siding, foundation forms, foundation drain systems, fencing, railing, decking, architectural trim, windows, insulation, wallboard, ceilings, pipe and plumbing, flooring, masonry, and the like.

It will be understood that the description and drawings presented herein represent one or more exemplary embodiments of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

The invention claimed is:

1. A computer implemented building product selection method of producing building product specifications for a job submittal package, comprising:
   providing a database comprising a plurality of building products;
   accepting user selections of building project criteria;
   correlating one or more of said plurality of building products with said building project criteria;
   providing a user with recommendations of one or more building products and combinations of building products based on said correlating step for a job submittal package;
   providing stored database data of the building products having at least a percentage of recycled content;
   providing a running tally of a total percentage of recycled materials included in the building products; and
   computing Leadership in Energy and Environmental Design, LEED, points for the building products, and indicating the LEED points accumulated by the job submittal package toward becoming LEED certified.

2. The method of claim 1, wherein the building project criteria comprise at least one of warranty duration, compliance approval, type of building product, and structure of a building.

3. The method of claim 2, wherein the step of providing a user with recommendations comprises providing a display of a total number of said building products that meet the users building project criteria.

4. The method of claim 3, further comprising correlating the recommendations with project specific identification information including one or more of project name, customer name, address, phone number and description information for the building project, wherein said project specific identification information is stored for later retrieval.

5. The method of claim 4, further comprising providing technical data sheet and supporting documentation relating to the correlated building products or correlated combinations of building products into a document format to allow viewing and printing by the user.

6. The method of claim 4, further comprising providing user access to technical data sheets regarding building product accessory items.

7. The method of claim 4, further comprising downloading and printing of structural drawings of one or more of said building products as published construction details.

8. The method of claim 4, further comprising providing the user with a plurality of color selections for one or more of said building products.

9. The method of claim 1, further comprising providing the user with information regarding regional availability of said building products.

10. The method of claim 1, further comprising generating a job submittal package based on said recommendations of one or more building products and combinations of building products.

11. The method of claim 1, further comprising providing live database updates to enable an administrator to modify the database to include new or revised information relating to said plurality of building products.

12. A building product selection system producing building product specifications for a job submittal package, comprising:
 a database containing information describing a plurality of building products;
 an interface for accepting user selections of building project criteria;
 a processor executing instructions for correlating one or more of said plurality of building products with said building project criteria;
 wherein the interface is further configured to display recommendations of one or more building products and combinations of building products for a job submittal package based on the correlations performed by the processor;
 providing stored database data of the building products having at least a percentage of recycled content;
 providing a running tally of a total percentage of recycled materials included in the building products; and
 computing Leadership in Energy and Environmental Design, LEED, points for the building products, and indicating the LEED points accumulated by the job submittal package toward becoming LEED certified.

13. The system of claim 12, wherein the processor is incorporated into a portable computing unit to enable the system to be transported to a worksite.

14. The system of claim 13, wherein the portable computing unit comprises a computing unit selected from the group consisting of laptop computers and hand-held computers.

15. A machine readable storage device tangibly embodying a series of instructions executable by the machine readable storage device to perform a series of steps producing building product specifications for a job submittal package, the steps comprising: accepting user selections of building project criteria; querying a database comprising information describing a plurality of building products; correlating one or more of said plurality of building products with said building project criteria based on a comparison between said building project criteria and said information describing said plurality of building products for a job submittal package; providing a user with recommendations of one or more building products and combinations of building products based on said correlating step; providing stored database data of the building products having at least a percentage of recycled content; providing a running tally of a total percentage of recycled materials included in the building products; and computing Leadership in Energy and Environmental Design, LEED, points for the building products, and indicating the LEED points accumulated for the job submittal package to be LEED certified.

16. The machine readable storage device of claim 15, wherein the building project criteria comprise at least one of warranty duration, compliance approval, type of building product, and structure of a building.

17. The machine readable storage device of claim 16, wherein the step of providing a user with recommendations comprises providing a display of a total number of said building products that meet the users building project criteria.

18. The machine readable storage device of claim 17, further comprising instructions for correlating the recommendations with project specific identification information including one or more of project name, customer name, address, phone number and description information for the building project, wherein said project specific identification information is stored for later retrieval.

19. A computer implemented roofing product selection method, comprising: providing a database comprising a plurality of roofing products; accepting user selections of roofing project criteria; correlating one or more of said plurality of roofing products with said roofing project criteria; providing a user with recommendations of one or more roofing products and combinations of roofing products based on said correlating step for a job submittal package; providing stored database data of the building products having at least a percentage of recycled content; providing a running tally of a total percentage of recycled materials included in the building products; and computing Leadership in Energy and Environmental Design, LEED, points for the building products, and indicating the LEED points accumulated by the job submittal package toward becoming LEED certified.

20. The method of claim 19, wherein the roofing project criteria comprise at least one of warranty duration, compliance approval, type of roofing product, and structure of a building.

21. The method of claim 20, wherein the step of providing a user with recommendations comprises providing a display of a total number of said roofing products that meet the users roofing project criteria.

22. The method of claim 21, further comprising correlating the recommendations with project specific identification information including one or more of project name, customer name, address, phone number and description information for the roofing project, wherein said project specific identification information is stored for later retrieval.

23. The method of claim 19, wherein the step of providing a user with recommendations further comprises indicating whether one or more roofing products and combinations of roofing products has recycled content.

24. The method of claim 23, wherein the indication comprises a percentage recycled content.

25. The building product selection method of claim 1, wherein the building product is selected from the group consisting of roofing, polymeric siding, fiber cement siding, masonry, stucco, mortars, foundation forms, foundation drain systems, fencing, railing, decking, architectural trim, doors, windows, architectural glass, glazing, ventilation, insulation, wallboard, ceilings, pipe, conduit, plumbing, and flooring.

26. The system of claim 12, further comprising a database of technical data sheet and supporting documentation relating to the correlated building products or correlated combinations of building products to allow viewing and printing by the user.

27. The building product selection method of claim 1, wherein the step of accepting user selections of building project criteria comprises accepting a user selection of a roof or structure leak detection system.

28. The system of claim 12, further comprising a database of information regarding a roof or structure leak detection system.

29. The machine readable storage device of claim 15, wherein querying a database comprises querying a database of information containing a roof or structure leak detection system.

30. The roofing product selection method of claim 19, wherein the step of accepting user selections further comprises accepting a user selection of a roof or structure leak detection system.

31. The roofing product selection method of claim 19, further comprising:
 providing an option of selecting a LEED Report in the form of, a LEED CS report for a core and shell, a LEED EB report for an existing building, a LEED NC report for new construction or a LEED H report for homes.

32. The computer implemented building product selection method of claim 1, further comprising:
 providing an option of selecting a LEED Report in the form of, a LEED CS report for a core and shell, a LEED EB report for an existing building, a LEED NC report for new construction or a LEED H report for homes.

33. The building product selection system of claim 12, further comprising:
 providing an option of selecting a LEED Report in the form of, a LEED CS report for a core and shell, a LEED EB report for an existing building, a LEED NC report for new construction or a LEED H report for homes.

34. The building product selection system of claim 13, further comprising: providing an option of selecting a LEED Report in the form of, a LEED CS report for a core and shell, a LEED EB report for an existing building, a LEED NC report for new construction or a LEED H report for homes.

35. The roofing product selection method of claim 19, further comprising:
 providing an option of selecting a LEED Report in the form of, a LEED CS report for a core and shell, a LEED EB report for an existing building, a LEED NC report for new construction or a LEED H report for homes.

\* \* \* \* \*